(12) United States Patent
Hayashi et al.

(10) Patent No.: US 7,819,419 B2
(45) Date of Patent: Oct. 26, 2010

(54) OCCUPANT PROTECTION DEVICE

(75) Inventors: Shigeki Hayashi, Kasugai (JP); Makoto Nagano, Toyota (JP); Tatsuya Hattori, Aichi-gun (JP); Hideyuki Murasato, Nisshin (JP); Makoto Sekizuka, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1149 days.

(21) Appl. No.: 10/542,633

(22) PCT Filed: Dec. 24, 2003

(86) PCT No.: PCT/JP03/16517
§ 371 (c)(1),
(2), (4) Date: Jul. 29, 2005

(87) PCT Pub. No.: WO2004/065179
PCT Pub. Date: Aug. 5, 2004

(65) Prior Publication Data
US 2006/0022441 A1    Feb. 2, 2006

(30) Foreign Application Priority Data
Jan. 20, 2003  (JP) ............... 2003-011489
Jan. 20, 2003  (JP) ............... 2003-011514

(51) Int. Cl.
*B60R 21/16*    (2006.01)
(52) U.S. Cl. .......... 280/730.1; 280/729; 280/730.2
(58) Field of Classification Search ........ 280/729, 280/730.1, 730.2
See application file for complete search history.

(56) References Cited

U.S. PATENT DOCUMENTS

| 5,927,750 | A | 7/1999 | Nakamura et al. |
| 6,349,964 | B1 * | 2/2002 | Acker et al. ............. 280/730.2 |
| 7,121,580 | B2 * | 10/2006 | Sato et al. ............... 280/730.2 |
| 7,207,595 | B2 * | 4/2007 | Kanto et al. ............. 280/730.2 |
| 7,278,656 | B1 * | 10/2007 | Kalandek ................ 280/730.2 |

(Continued)

FOREIGN PATENT DOCUMENTS

| CN | 1150564 A | 5/1997 |
| CN | 1312194 A | 9/2001 |
| DE | 196 46 698 A1 | 5/1997 |
| EP | 1 344 694 A2 | 9/2003 |
| EP | 1 393 998 A1 | 3/2004 |

(Continued)

OTHER PUBLICATIONS

Decision of Refusal issued in Japanese Patent Application No. 2008-116763; mailed Apr. 14, 2010; with partial English-language translation.

*Primary Examiner*—Toan C To
(74) *Attorney, Agent, or Firm*—Oliff & Berridge, PLC

(57) ABSTRACT

An occupant protection device includes an airbag 10 that is inflated with gas from an inflator 20 at a side of an occupant B to protect the body of the occupant B from the shoulder Ba to the lumbar Bd, the airbag 10 having substantially the same vertical dimension as that of a seat back Aa. In this occupant protection device, uninflatable sections 12 and 13 are formed in a vertical center portion 10*c* of the airbag 10, that is, at a position corresponding to the chest Bb and the abdomen Bc of the occupant B. Accordingly, a region which is thinner than an upper portion 10*a* and a lower portion 10*b* of the airbag 10 in a vehicle width direction when the airbag 10 is inflated and that extends substantially parallel to the seat back Aa is formed substantially at the center of the airbag 10.

5 Claims, 26 Drawing Sheets

U.S. PATENT DOCUMENTS

| | | | |
|---|---|---|---|
| 7,316,415 B2 * | 1/2008 | Jamison | 280/729 |
| 7,347,444 B2 * | 3/2008 | Wheelwright | 280/729 |
| 7,350,811 B2 * | 4/2008 | Sato | 280/743.2 |
| 2003/0168836 A1 * | 9/2003 | Sato et al. | 280/730.2 |
| 2004/0124615 A1 | 7/2004 | Tanase et al. | |
| 2005/0023808 A1 * | 2/2005 | Sato et al. | 280/730.2 |
| 2006/0232054 A1 * | 10/2006 | Schlosser et al. | 280/743.2 |

FOREIGN PATENT DOCUMENTS

| | | |
|---|---|---|
| JP | U 3013763 | 5/1995 |
| JP | A 9-123864 | 5/1997 |
| JP | A 09-136595 | 5/1997 |
| JP | A 09-202203 | 8/1997 |
| JP | A 09-272393 | 10/1997 |
| JP | A 10-273010 | 10/1998 |
| JP | A 10-287195 | 10/1998 |
| JP | A 10-315891 | 12/1998 |
| JP | A 2000-85515 | 3/2000 |
| JP | A 2000-272463 | 10/2000 |
| JP | A 2000-289556 | 10/2000 |
| JP | A 2001-163159 | 6/2001 |
| JP | A 2002-79861 | 3/2002 |
| JP | A 2003-501303 | 1/2003 |
| JP | A 2003-137059 | 5/2003 |
| JP | A 2003-237520 | 8/2003 |
| JP | A 2004-58860 | 2/2004 |
| WO | WO 00/46076 | 8/2000 |
| WO | WO 02/100691 A1 | 12/2002 |

* cited by examiner (a)

(b)

(c)

(a) (b)

OCCUPANT PROTECTION DEVICE

TECHNICAL FIELD

The present invention relates to an occupant protection device including an airbag for protecting an occupant by being inflated with gas supplied from an inflator when, for example, a side collision or the like of a vehicle occurs.

BACKGROUND ART

This type of occupant protection device is described in, for example, Japanese Unexamined Patent Application Publication No. 2000-289556. This publication discloses an occupant protection device including an airbag disposed such that the airbag can be inflated at the side of an occupant which is adjacent to a door. When a side collision or the like of a vehicle occurs, the airbag is inflated with gas supplied from an inflator in order to protect the head and torso of the occupant.

In the occupant protection device according to the above-mentioned publication, when a side collision of the vehicle occurs, the airbag protects the head and torso of the occupant. However, the occupant protection device according to the above-mentioned publication does not aim to protect the torso of the occupant, in particular the chest and abdomen of the occupant. Accordingly, there is a risk that a large load will be applied to the chest and abdomen of the occupant, and there is a room for improvement.

In addition, this type of occupant protection device is described in, for example, Japanese Unexamined Patent Application Publication No. 9-202203. This publication also discloses an occupant protection device including an airbag disposed such that the airbag can be inflated at the side of an occupant which is adjacent to a door. When a side collision or the like of a vehicle occurs, the airbag is inflated with gas supplied from an inflator in order to protect the head and chest of the occupant.

In the occupant protection device according to the above-mentioned publication, when a side collision of the vehicle occurs, the airbag protects the head and chest of the occupant. However, in the occupant protection device according to the above-mentioned publication, the shape of the airbag is not determined with the consideration of the occupant's body shape or the shape of the door. Therefore, there is a risk that the inflated airbag will apply a large local load to the chest of the occupant, and there is a room for improvement.

DISCLOSURE OF INVENTION

An object of the present invention is to prevent the chest and abdomen of an occupant from receiving a large load when a side collision or the like of a vehicle occurs. Another object of the present invention is to prevent the chest of the occupant from receiving a large local load when a side collision or the like of the vehicle occurs.

One feature of the present invention is that an occupant protection device includes an airbag that is inflated with gas from an inflator at a side of an occupant to protect the body of the occupant from the shoulder to the lumbar, the airbag having substantially the same vertical dimension as that of a seat back and having a first region that is thinner than other regions in a vehicle width direction in the inflated state, the first region being disposed substantially at the center of the airbag in the vertical direction and extending substantially parallel to the seat back.

In this occupant protection device, when a side collision or the like of the vehicle occurs, the airbag is inflated with the gas from the inflator at the side of the occupant and is placed between the vehicle body and the body of the occupant from the shoulder to the lumbar. Therefore, if a part of the vehicle body enters the vehicle cabin, the occupant is pushed by the airbag toward the center of the vehicle cabin in the vehicle width direction, and the body of the occupant from the shoulder to the lumbar is protected.

In this occupant protection device, the region which is thinner than other regions in the vehicle width direction in the inflated state is formed substantially at the center of the airbag in the vertical direction. Accordingly, when the occupant is pushed by the airbag toward the center of the vehicle cabin in the vehicle width direction, although the shoulder and the lumbar, which come into contact with the upper and lower portions, respectively, receive a large load, the chest and the abdomen, which come into contact with a substantially central portion of the airbag in the vertical direction, do not receive a large load. Therefore, when a side collision or the like of the vehicle occurs, the occupant is pushed and moved toward the center of the vehicle cabin in the vehicle width direction without receiving a large load at the chest and the abdomen.

In addition, in this occupant protection device, the first region of the airbag which is thin in the vehicle width direction in the inflated state is formed substantially at the center of the airbag in the vertical direction and extends substantially parallel to the seat back. Therefore, the first region can be positioned along the side of the occupant from the chest to the abdomen, and the load applied to the chest and the abdomen of the occupant when a side collision or the like of the vehicle occurs is reliably reduced.

Another feature of the present invention is that the airbag also has a second region that is thin in the vehicle width direction in the inflated state, the second region being disposed in front of and above the first region (the region of the airbag which is thin in the vehicle width direction in the inflated state and is formed substantially at the center of the airbag in the vertical direction) at a position corresponding to the upper arm of the occupant. In this occupant protection apparatus, when a side collision or the like of the vehicle occurs, the occupant is pushed and moved toward the center of the vehicle cabin in the vehicle width direction without receiving a large load at the chest, the abdomen, and the upper arm.

In addition, another feature of the present invention is that the first region, which is thin in the vehicle width direction in the inflated state and is formed substantially at the center of the airbag in the vertical direction, is substantially oval in side view. In this occupant protection apparatus, even when the occupant sits at different positions in the front-back direction, the first region can be positioned along the side of the occupant from the chest to the abdomen. Accordingly, the load applied to the chest and the abdomen of the occupant when a side collision or the like of the vehicle occurs is reliably reduced.

In addition, another feature of the present invention is that the first region, which is thin in the vehicle width direction in the inflated state and is formed substantially at the center of the airbag in the vertical direction, is divided into sections in the vertical direction, and a gas passage is provided between the sections. In this occupant protection device, when a side collision or the like of the vehicle occurs, the gas supplied from the inflator quickly flows in the front-rear direction of the vehicle through the gas passage in the airbag. Accordingly, the airbag is quickly inflated in the front-rear direction of the vehicle, and the airbag is quickly placed between the occupant and the vehicle body.

In addition, another feature of the present invention is that an occupant protection device includes an airbag that is inflated with gas from an inflator at a side of an occupant to protect the body of the occupant from the shoulder to the lumbar and gas-pressure controlling means for setting an inner pressure of at least one of an upper portion and a lower portion of the airbag higher than an inner pressure of the remaining portion. In this occupant protection device, when a side collision or the like of the vehicle occurs, the shoulder or the lumbar of the occupant, which comes into contact with the upper or lower portion of the inflated airbag, is quickly moved by being pushed with a large gas pressure. Accordingly, when a side collision or the like of the vehicle occurs, the occupant is quickly pushed and moved toward the center of the vehicle cabin in the vehicle width direction without receiving a large load at the chest and the abdomen.

In addition, another feature of the present invention is that the upper portion or the lower portion of the airbag is thicker than the remaining portion in the vehicle width direction in the inflated state. In this occupant protection device, when a side collision or the like of the vehicle occurs, the shoulder or the lumbar of the occupant, which comes into contact with the upper or lower portion of the inflated airbag, is largely moved. Accordingly, when a side collision or the like of the vehicle occurs, the occupant is largely moved toward the center of the vehicle cabin in the vehicle width direction without receiving a large load at the chest and the abdomen.

In addition, another feature of the present invention is that an occupant protection device includes an airbag that is inflated with gas from an inflator at a side of an occupant to protect the body of the occupant from the shoulder to the lumbar and inflation controlling means for inflating at least one of an upper portion and a lower portion of the airbag before the remaining portion. In this occupant protection device, when a side collision or the like of the vehicle occurs, the shoulder or the lumbar of the occupant, which comes into contact with the upper or lower portion of the inflated airbag, is pushed before the chest and the abdomen of the occupant. Therefore, when a side collision or the like of the vehicle occurs, the occupant is pushed and moved toward the center of the vehicle cabin in the vehicle width direction without receiving a large load at the chest and the abdomen.

In addition, another feature of the present invention is that the remaining portion that is inflated after the upper or lower portion of the airbag extends substantially parallel to a seat back. In this occupant protection device, the remaining portion that is inflated after the upper or lower portion of the airbag can be positioned along the side of the occupant from the chest to the abdomen. Accordingly, and the load applied to the chest and the abdomen of the occupant when a side collision or the like of the vehicle occurs is reliably reduced.

In addition, another feature of the present invention is that the inflation controlling means for inflating the upper or lower portion of the airbag before the remaining portion is gas-flow regulating means for causing the gas to flow into the upper portion or the lower portion of the airbag before flowing into the remaining portion, the gas-flow regulating means being formed in the airbag by sewing. In this occupant protection device, the inflation controlling means is easily formed.

In addition, another feature of the present invention is that an occupant protection device includes an airbag that is inflated with gas from an inflator at a side of an occupant to protect the body of the occupant from the shoulder to the lumbar, the airbag including shape adjusting means for adjusting the shape of the airbag so that the side of the airbag facing the occupant extends along the side of the occupant in the inflated state. In this occupant protection device, the occupant is prevented from receiving a local load from the inflated airbag. Accordingly, not only the load applied to the shoulder and the lumbar of the occupant when a side collision or the like of the vehicle occurs but also the load applied to the chest and the abdomen of the occupant is reliably reduced.

In addition, another feature of the present invention is that the shape adjusting means included in the airbag that inflates at the side of the occupant is one or more straps that extend in the vehicle width direction in the airbag. In this occupant protection device, the shape adjusting means is easily formed.

In addition, another feature of the present invention is that the airbag that inflates at the side of the occupant includes an inflatable body at the bottom of the airbag, the inflatable body being inflated at the side of the thigh of the occupant. In this occupant protection device, the thigh of the occupant is also pushed by the inflated airbag when a side collision or the like of the vehicle occurs. Therefore, when a side collision or the like of the vehicle occurs, the occupant is pushed and moved toward the center of the vehicle cabin in the vehicle width direction without receiving a large load at the chest and the abdomen.

In addition, another feature of the present invention is that the airbag that inflates at the side of the occupant is folded such that an upper portion and a lower portion are placed on a center portion and is then rolled or accordion-folded in a front-to-rear direction of the vehicle. In this occupant protection device, when a side collision or the like of the vehicle occurs, the airbag is first inflated in the front-rear direction of the vehicle, and then in the vertical direction. Therefore, although the airbag is attached to the seat back or a door portion corresponding thereto in the folded and rolled state, the airbag is quickly and reliably inflated in the space between the occupant and the vehicle body when a side collision or the like of the vehicle occurs.

In addition, another feature of the present invention is that an occupant protection device includes an airbag attached to a seat of a vehicle, the airbag being inflated with gas from an inflator to protect the body of an occupant and moving the chest of the occupant away from a projecting portion of the vehicle when the vehicle collides on one side. In this occupant protection device, the airbag attached to the seat is inflated with gas from the inflator when a side collision or the like of the vehicle occurs, and moves the chest of the occupant away from the projecting portion of the vehicle. Accordingly, when a side collision or the like of the vehicle occurs, the chest of the occupant is prevented from encountering the projecting portion of the vehicle, and the load applied to the chest of the occupant is reduced.

In addition, another feature of the present invention is that the airbag attached to the seat moves the chest of the occupant diagonally to the front away from a door of the vehicle. In this occupant protection device, the airbag, which is attached to the seat and is inflated when a side collision or the like of the vehicle occurs, moves the chest of the occupant diagonally to the front away from the door of the vehicle. Therefore, the chest of the occupant is reliably prevented from encountering the armrest provided on the vehicle door, and the load applied to the chest of the occupant is reduced.

In addition, another feature of the present invention is that the airbag, which is attached to the seat and is inflated with the gas from the inflator when a side collision or the like of the vehicle occurs, includes a first inflatable body that inflates between a seat back and the back of the occupant along the edge adjacent to the door and a second inflatable body that inflates between the door and the side of the occupant adjacent to the door. In this occupant protection device, when a side collision or the like of the vehicle occurs, the first and second inflatable bodies of the airbag reliably move the chest of the occupant diagonally to the front away from the door. In addition, the second inflatable body of the airbag serves to reduce the load applied to the occupant from the door.

In addition, another feature of the present invention is that an occupant protection device includes an airbag that is inflated with gas from an inflator at a side of an occupant which faces a door to protect the body of the occupant from the shoulder to the lumbar, the airbag including an inflatable body having an external shape such that the inflatable body extends along the inner side of the door and the side of the occupant facing the door to fill a space between the inner side of the door and the side of the occupant facing the door in the inflated state.

In this occupant protection device, when a side collision or the like of the vehicle occurs, the airbag is inflated with the gas from the inflator at the side of the occupant facing the door, and is placed between the door and the body of the occupant from the shoulder to the lumbar. Therefore, if the door of the vehicle enters the vehicle cabin, the occupant is pushed by the airbag toward the center of the vehicle cabin in the vehicle width direction, and accordingly the body of the occupant from the shoulder to the lumbar is protected.

In this occupant protection device, the airbag includes the inflatable body having the external shape such that the inflatable body extends along the inner side of the door and the side of the occupant facing the door to fill the space between the inner side of the door and the side of the occupant facing the door in the inflated state. Therefore, in this occupant protection apparatus, the substantial contact area between the airbag and the occupant is increased. Accordingly, when a side collision or the like of the vehicle occurs, the chest and the like of the occupant is prevented from receiving a large local load.

In addition, another feature of the present invention is that an occupant protection device includes an airbag that is inflated with gas from an inflator at a side of an occupant which faces a door to protect the body of the occupant from the shoulder to the lumbar, the airbag including a recess for receiving a projecting portion that projects in the vehicle width direction from one of the inner side of the door and the side of the occupant facing the door in the inflated state.

In this occupant protection device, the recess of the airbag for receiving the projecting portion that projects in the vehicle width direction from one of the inner side of the door and the side of the occupant facing the door prevents a particular part, for example, the chest of the occupant from being locally pressed. Accordingly, when a side collision or the like of the vehicle occurs, a particular part, for example, the chest of the occupant is prevented from receiving a large local load.

In addition, another feature of the present invention is that the projecting portion is the upper arm of the occupant and the recess of the airbag receives the upper arm of the occupant in the inflated state. In this occupant protection device, the load applied to the chest of the occupant from the upper arm of the occupant pushed by the inflated airbag is reduced. Accordingly, when a side collision or the like of the vehicle occurs, the chest of the occupant is prevented from receiving a large local load.

In addition, another feature of the present invention is that the above-described projecting portion is an armrest provided on the inner side of the door and the recess of the airbag receives the armrest on the inner side of the door in the inflated state. In this occupant protection device, the inflated airbag is prevented from being pushed by the armrest on the inner side of the door, and the load applied to the chest of the occupant from the armrest is reduced. Accordingly, when a side collision or the like of the vehicle occurs, the chest of the occupant is prevented from receiving a large local load.

In addition, another feature of the present invention is that an occupant protection device includes an airbag that is inflated with gas from an inflator at a side of an occupant which faces a door to protect the body of the occupant from the shoulder to the lumbar, wherein the airbag includes an upper inflatable body and a lower inflatable body disposed so as to face each other from above and below across an armrest provided on the inner side of the door.

In this occupant protection device, when the door of the vehicle enters the vehicle cabin, neither of the upper and lower inflatable bodies of the airbag is largely pushed by the armrest on the inner side of the door. The upper inflatable body of the airbag mainly pushes the shoulder of the occupant toward the center of the vehicle cabin in the vehicle width direction, and the lower inflatable body of the airbag mainly pushes the lumbar of the occupant toward the center of the vehicle cabin in the vehicle width direction. Accordingly, when a side collision or the like of the vehicle occurs, the chest of the occupant is prevented from receiving a large local load.

In addition, another feature of the present invention is that the upper inflatable body of the airbag has a region which is thinner than other regions in the vehicle width direction in the inflated state at a position corresponding to the upper arm of the occupant. In this occupant protection device, the upper arm of the occupant is prevented from being pushed by the upper inflatable body of the inflated airbag, and the load applied to the chest of the occupant by the upper arm of the occupant pushed by the upper inflatable body is reduced. Accordingly, when a side collision or the like of the vehicle occurs, the chest of the occupant is prevented from receiving a large local load.

In addition, another feature of the present invention is that the upper inflatable body of the airbag is thicker than the lower inflatable body in the vehicle width direction in the inflated state. In this occupant protection device, a relatively large upper space between the shoulder of the occupant and an upper portion of the door above the armrest and a relatively small lower space between the lumbar of the occupant and a lower portion of the door below the armrest can be reliably filled with the upper and lower inflatable bodies of the airbag. Accordingly, the occupant can be reliably protected.

In addition, another feature of the present invention is that the lower inflatable body of the airbag is inflated before the upper inflatable body. In this occupant protection device, the lower inflatable body of the airbag can be reliably inflated in the lower space between the lumbar of the occupant and the lower portion of the door below the armrest, which is smaller than the upper space between the shoulder of the occupant and the upper portion of the door above the armrest.

In addition, another feature of the present invention is that each of the lower inflatable body and the upper inflatable body of the airbag has a dedicated inflator. In this occupant protection device, the times at which the inflators are activated can be controlled individually, and the upper and lower inflatable bodies of the airbag can be inflated individually at desired times.

BEST MODE FOR CARRYING OUT THE INVENTION

Figure 1:
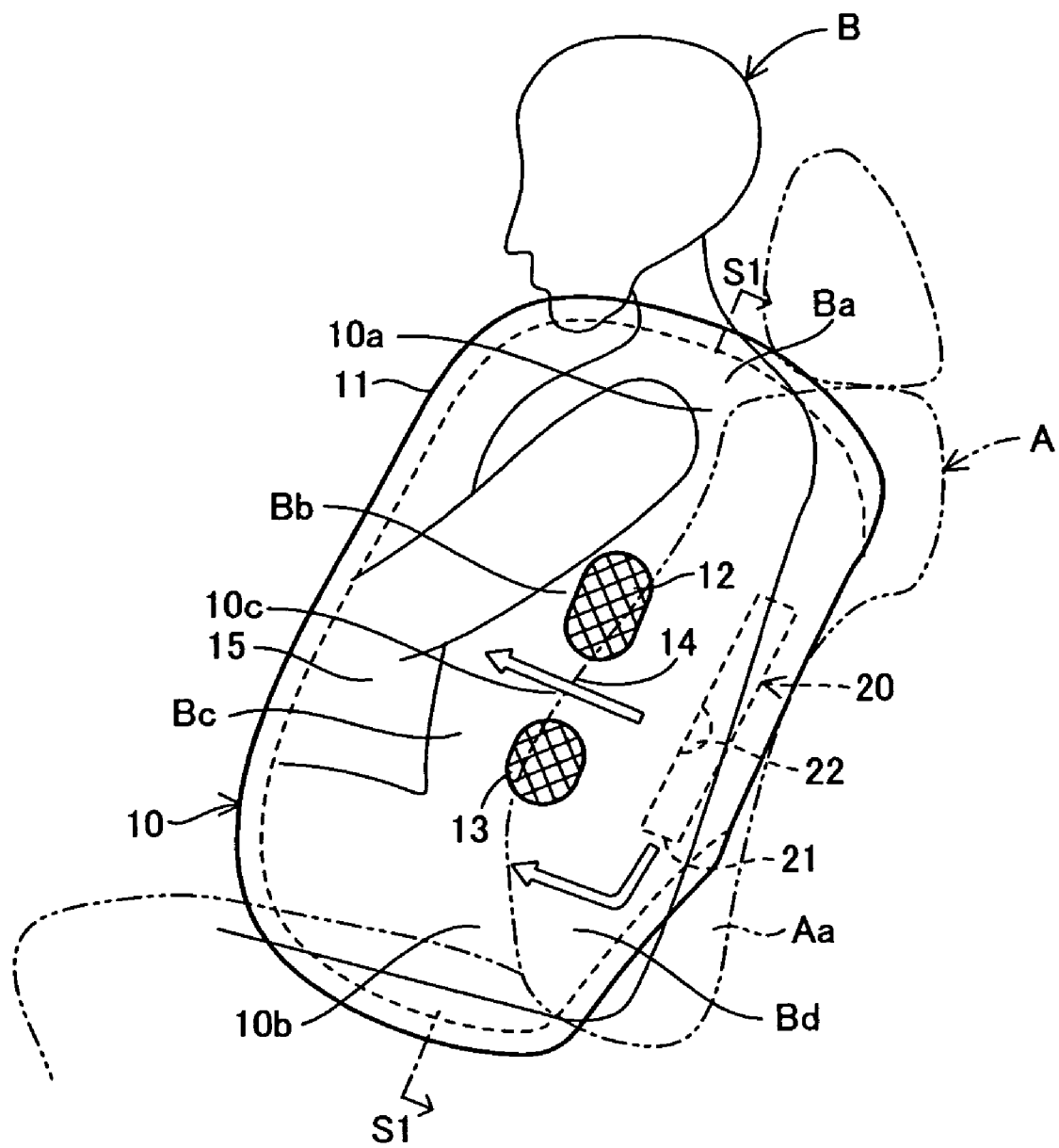
FIG. 1 is a side view schematically illustrating an occupant protection device according to a first embodiment of the present invention.
Figure 2:
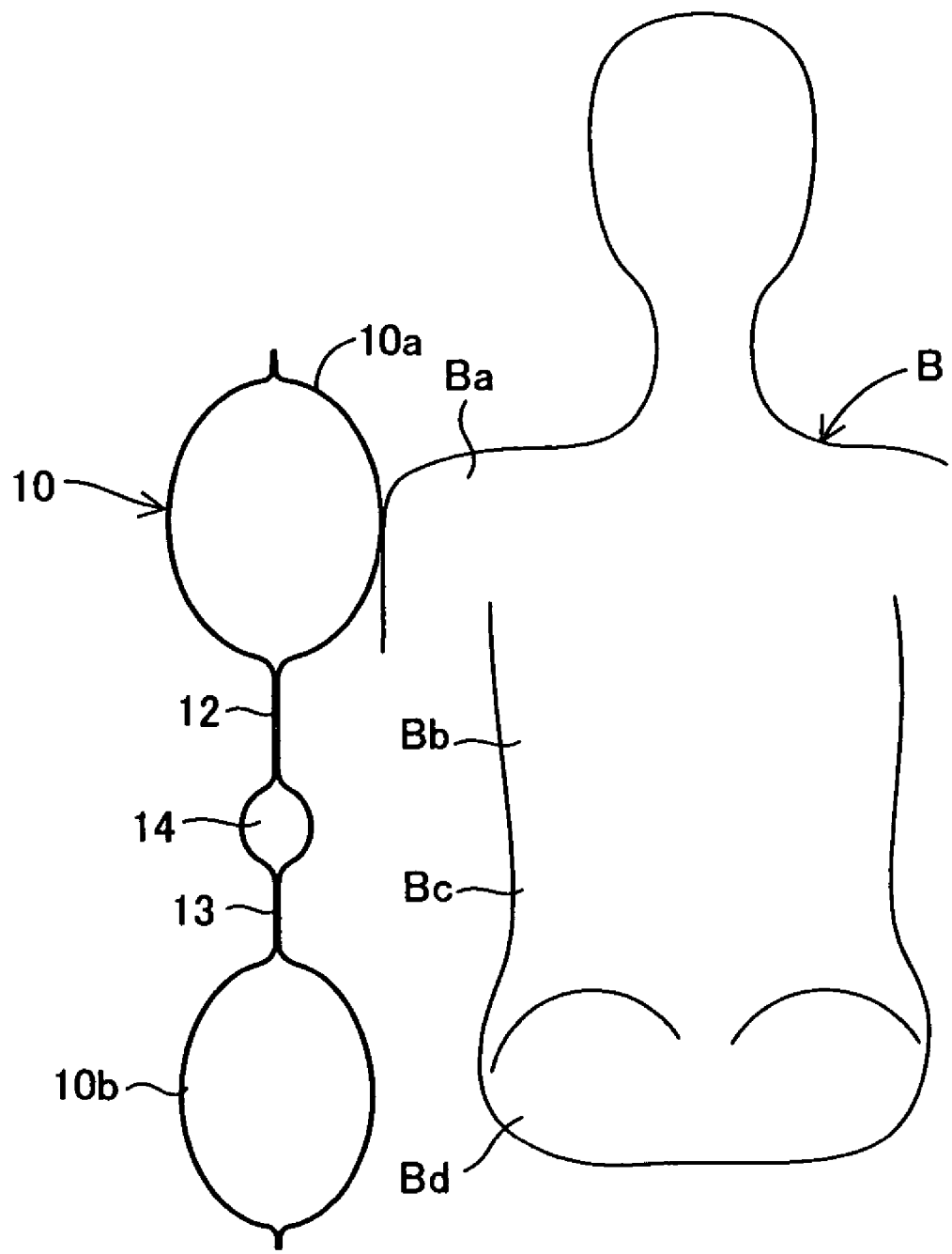
FIG. 2 is a sectional view of FIG. 1 taken along line S1-S1.
Figure 3:
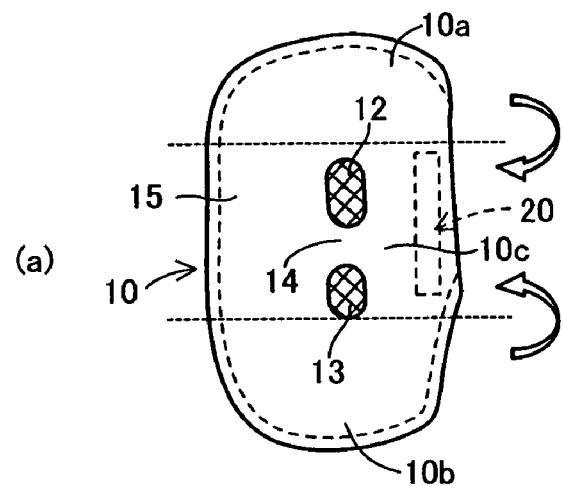
FIG. 3 is a diagram illustrating the manner in which the airbag shown in FIG. 1 is folded.
Figure 3:
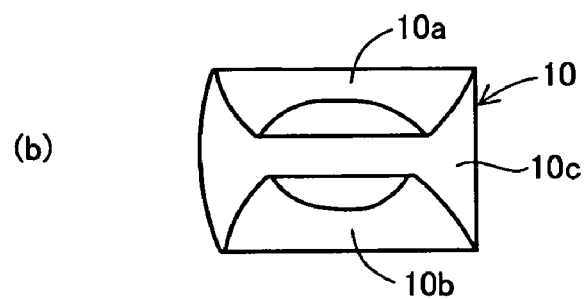
Figure 3:
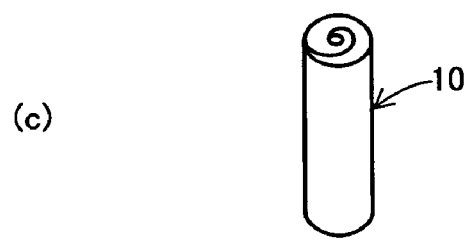

Embodiments of the present invention will be described below with reference to the drawings. FIGS. 1 to 3 schematically illustrate an occupant protection device according to a first embodiment of the present invention. The occupant protection device according to the first embodiment is attached to a seat back Aa included in a seat A of a vehicle and includes an airbag 10 disposed such that the airbag 10 can be inflated at the side of an occupant B which is adjacent to a door and an inflator 20 that supplies gas to the airbag 10.

When a side collision or the like of the vehicle occurs, the airbag 10 is inflated at the side of the occupant B adjacent to the door with gas supplied from the inflator 20, as shown in FIGS. 1 and 2. Thus, the airbag 10 protects the body of the occupant B from the shoulder Ba to the lumbar Bd. The vertical dimension of the airbag 10 is substantially the same as that of the seat back Aa. The airbag 10 is formed in a bag-like shape by folding an airbag material with a predetermined shape in half and airtightly bonding a peripheral region 11 thereof. As shown in FIG. 1, the airbag 10 has an inflatable body 15 and a pair of uninflatable sections 12 and 13 arranged vertically in a central area of the inflatable body 15 in the inflated state in both a front-rear direction of the vehicle and the vertical direction.

The uninflatable sections 12 and 13 are provided to form a region which is thinner than other regions in a vehicle width direction when the airbag 10 is inflated, and are disposed at positions corresponding to the chest Bb and the abdomen Bc, respectively, of the occupant B. The uninflatable sections 12 and 13 are formed by partially bonding the folded airbag material. In addition, each of the uninflatable sections 12 and 13 is substantially oval (elliptical) in side view, and a gas passage 14 for allowing gas from the inflator 20 to flow frontward is provided between the uninflatable sections 12 and 13. The uninflatable sections 12 and 13 are linearly arranged along the seat back Aa in the vertical direction, and the above-described region extends substantially parallel to the seat back Aa.

As shown in FIG. 3, the airbag 10 is first folded such that an upper portion 10a and a lower portion 10b are placed on a vertical center portion 10c, and is then rolled (or accordion-folded) in a front-to-rear direction of the vehicle. The airbag 10 is attached to the seat back Aa in this fashion. When the airbag 10 is folded, first, the upper and lower portions 10a and 10b are entirely folded onto the vertical center portion 10c, and then ends of the upper and lower portions 10a and 10b are folded over, as shown in FIG. 3(b). In addition, the folded airbag 10 is rolled in such a manner that the front end thereof is rolled inward.

The inflator 20 is activated and supplies gas to the airbag 10 when a side collision or the like of the vehicle occurs (such a situation is detected by a sensor (not shown)). The inflator 20 is disposed in the airbag 10 and has gas discharge holes 21 and 22 at the bottom end and a lower front position, respectively, of the inflator 20. The gas discharge hole 21 faces downward to discharge the gas downward, and the gas discharge hole 22 faces front to discharge the gas frontward.

In the occupant protection device according to the first embodiment that is structured as described above, if a side collision or the like of the vehicle occurs, the inflator 20 is activated when an acceleration detected by a corresponding sensor (not shown) exceeds a set value. Accordingly, the gas is supplied to the airbag 10 through the gas discharge holes 21 and 22 of the inflator 20, and the airbag 10 is inflated at the side of the occupant B. Thus, the airbag 10 is placed between the vehicle body (door (not shown)) and the body of the occupant B from the shoulder Ba to the lumbar Bd. Therefore, if a part of the vehicle body enters the vehicle cabin, the occupant B is pushed by the airbag 10 toward the center of the vehicle cabin in the vehicle width direction, and accordingly the body of the occupant B from the shoulder Ba to the lumbar Bd is protected.

In the occupant protection device according to the first embodiment, the region which is thinner than other regions in the vehicle width direction in the inflated state is formed of the uninflatable sections 12 and 13 in the vertical center portion 10c of the inflatable body 15 of the airbag 10, that is, at a position corresponding to the chest Bb and the abdomen Bc of the occupant B. Accordingly, when the occupant B is pushed by the airbag 10 toward the center of the vehicle cabin in the vehicle width direction, although the shoulder Ba and the lumbar Bd, which come into contact with the upper and lower portions 10a and 10b, respectively, receive a large load, the chest Bb and the abdomen Bc, which come into contact with a substantially central portion of the airbag 10 in the vertical direction, do not receive a large load. Therefore, when a side collision or the like of the vehicle occurs, the occupant B is pushed and moved toward the center of the vehicle cabin in the vehicle width direction without receiving a large load at the chest Bb and the abdomen Bc.

In addition, in the occupant protection device according to the first embodiment, the above-described region formed of the uninflatable sections 12 and 13 extends substantially parallel to the seat back Aa. Therefore, in the first embodiment, the above-described region can be positioned along the side of the occupant B from the chest Bb to the abdomen Bc. Accordingly, the load applied to the chest Bb and the abdomen Bc of the occupant B when a side collision or the like of the vehicle occurs is reliably reduced.

In addition, in the first embodiment, the region of the airbag 10 which is thin in the vehicle width direction in the inflated state is positioned in a central area of the inflatable body 15 of the airbag 10 in the vertical direction, and is substantially oval in side view. Therefore, even when the occupant B sits at different positions in the front-back direction, the above-described region can be positioned along the side of the occupant B from the chest Bb to the abdomen Bc. Accordingly, the load applied to the chest Bb and the abdomen Bc of the occupant B when a side collision or the like of the vehicle occurs is reliably reduced.

In addition, in the first embodiment, the region of the airbag 10 which is thin in the vehicle width direction in the inflated state is formed of the uninflatable sections 12 and 13 positioned in the vertical center portion of the inflatable body 15 of the airbag 10, and thus the region is vertically divided into two sections with the gas passage 14 provided between the two sections. Therefore, when a side collision or the like of the vehicle occurs, the gas supplied from the gas discharge hole 22 of the inflator 20 quickly flows toward the front of the vehicle through the gas passage 14 in the airbag 10. Accordingly, the airbag 10 is quickly inflated in the front-rear direction of the vehicle, and the airbag 10 is quickly placed between the occupant B and the vehicle body.

In addition, in the first embodiment, the airbag 10, which is inflated at the side of the occupant B when a side collision or the like of the vehicle occurs, is first folded such that the upper and lower portions 10a and 10b are placed on the vertical center portion 10c, and is then rolled (or accordion-folded) in the front-to-rear direction of the vehicle. Accordingly, when a side collision or the like of the vehicle occurs, the airbag 10 is first inflated in the front-rear direction of the vehicle, and then in the vertical direction. Therefore, although the airbag 10 is attached to the seat back Aa in the folded and rolled state, the airbag 10 is quickly and reliably inflated in the space between the occupant B and the vehicle body when a side collision or the like of the vehicle occurs.

In the above-described first embodiment, the region of the airbag 10 which is thinner than other regions in the vehicle width direction in the inflated state is provided at a position corresponding to the chest Bb and the abdomen Bc of the occupant B by forming the vertically arranged uninflatable sections 12 and 13 in the airbag 10. However, in place of this structure, modifications schematically shown in FIGS. 4 and 5, FIGS. 6 and 7, FIGS. 8 and 9, FIGS. 10 and 11, FIGS. 12 and 13, and FIGS. 14 and 15 may also be applied.

Figure 4:
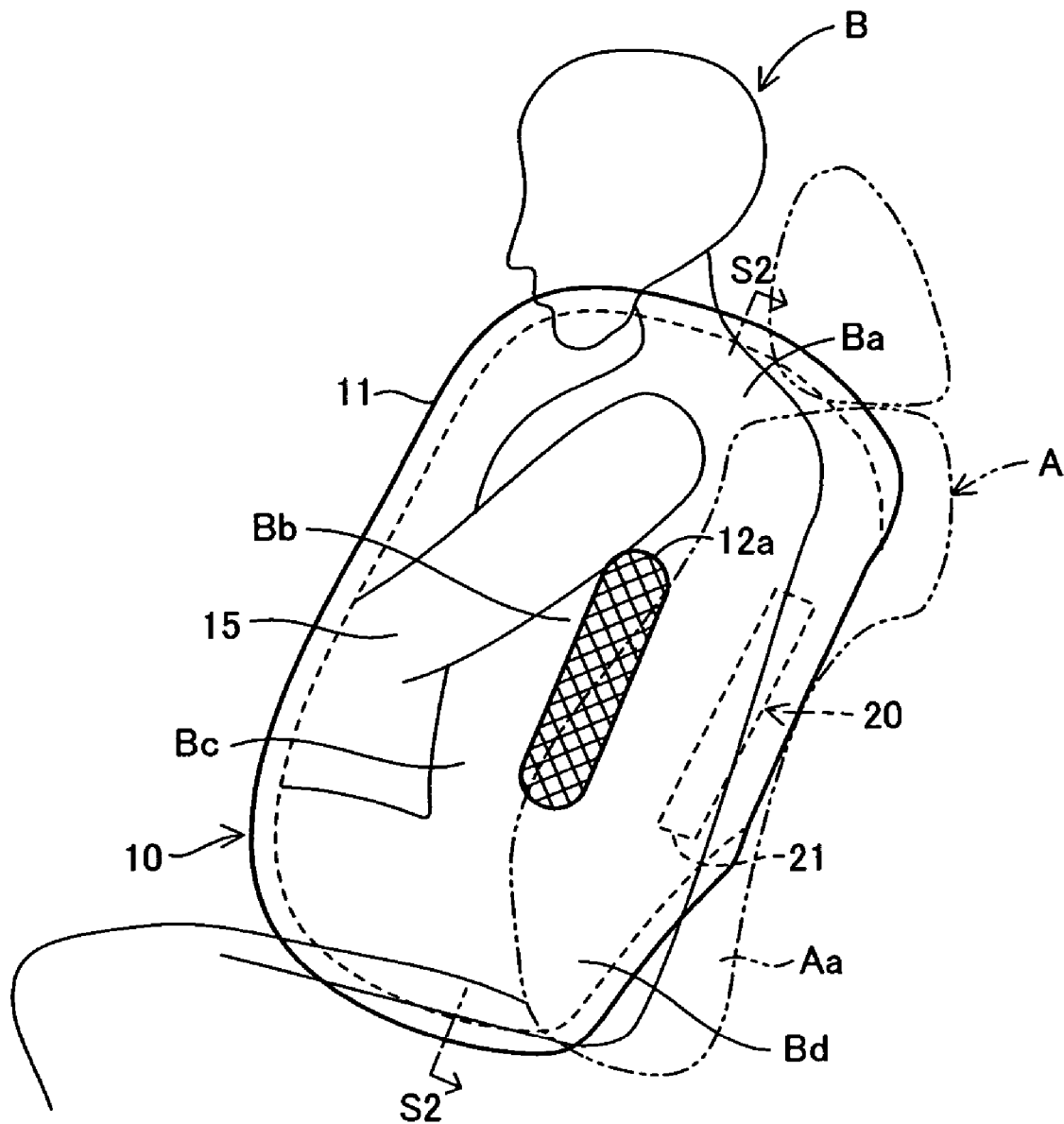
FIG. 4 is a side view schematically illustrating a first modification of the first embodiment.
Figure 5:
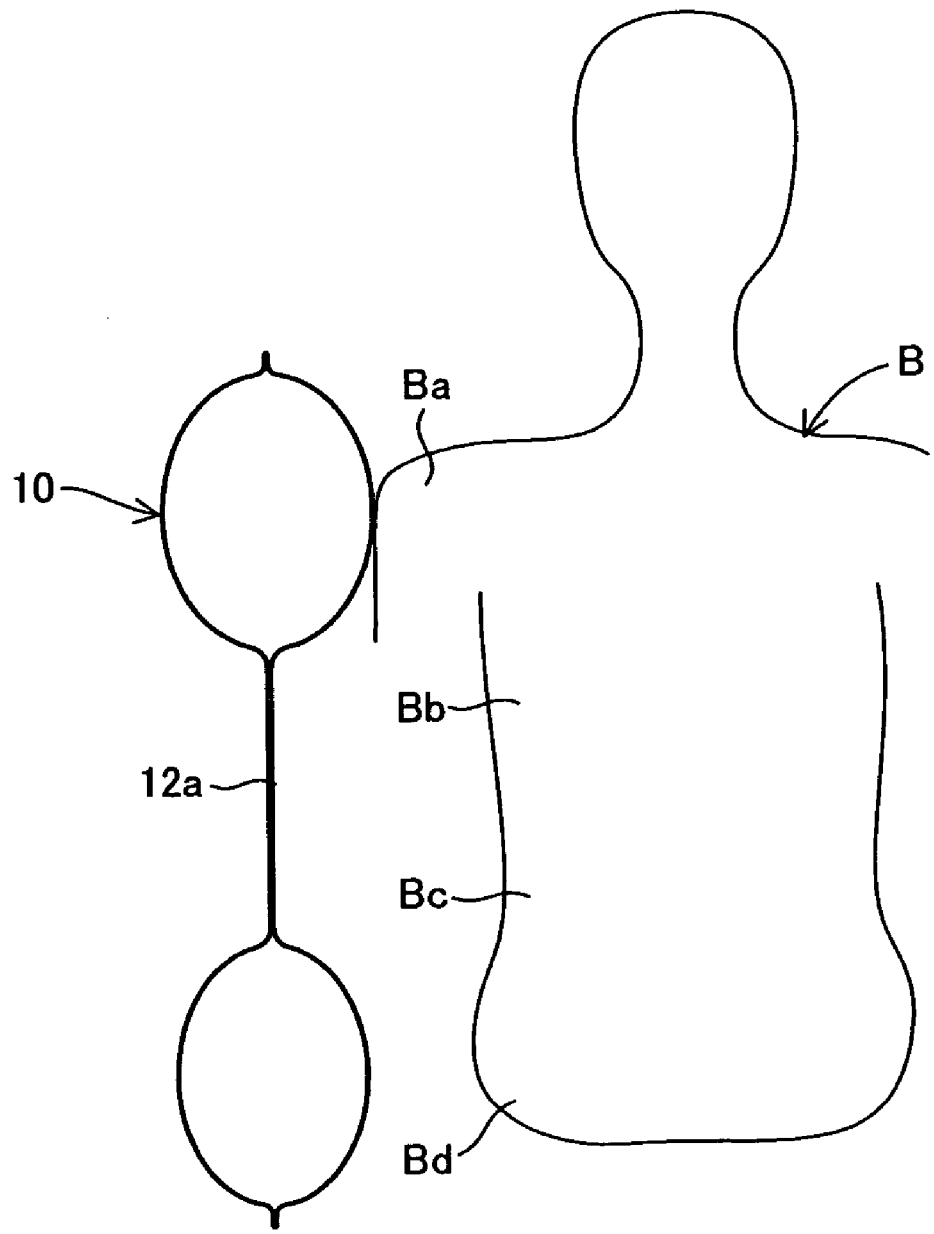
FIG. 5 is a sectional view of FIG. 4 taken along line S2-S2.

FIGS. 4 and 5 illustrate a first modification. In the first modification, a region of an airbag 10 which is thinner than other regions in the vehicle width direction in the inflated state is provided at a position corresponding to the chest Bb and the abdomen Bc of the occupant B by forming a single uninflatable section 12a in the airbag 10. The uninflatable section 12a is formed by partially bonding a folded airbag material, and extends substantially parallel to the seat back Aa. Therefore, in the first modification, the above-described region can be positioned along the side of the occupant B from the chest Bb to the abdomen Bc. Accordingly, the load applied to the chest Bb and the abdomen Bc of the occupant B when a side collision or the like of the vehicle occurs is reliably reduced. In the first modification, an inflator 20 having only a gas discharge hole 21 at the bottom end is used.

Figure 6:
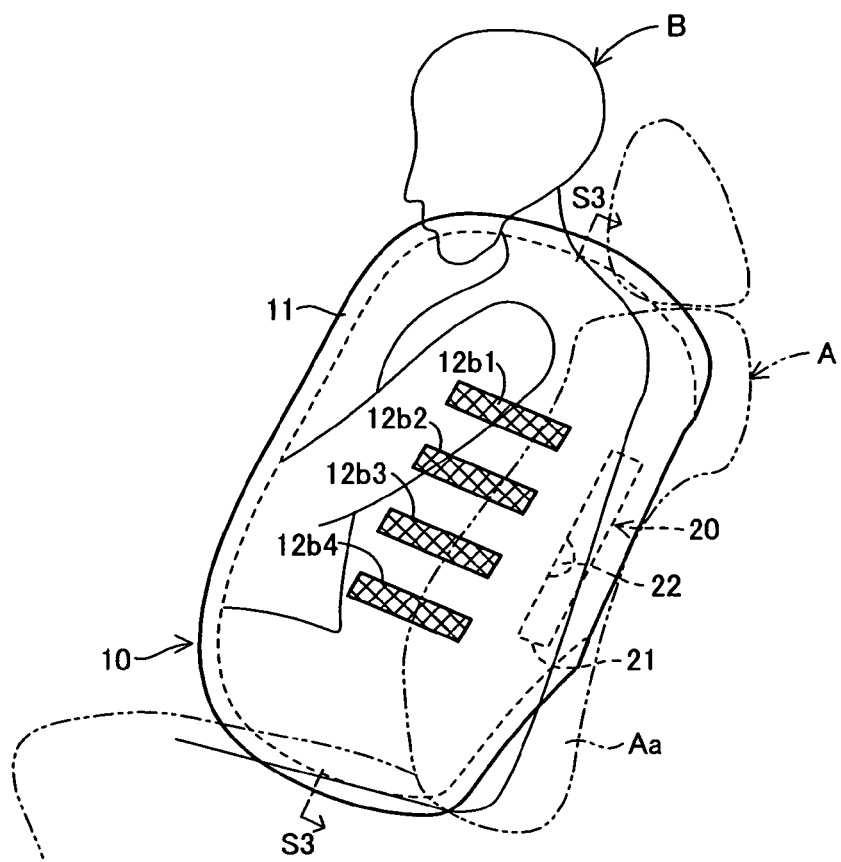
FIG. 6 is a side view schematically illustrating a second modification of the first embodiment.
Figure 7:
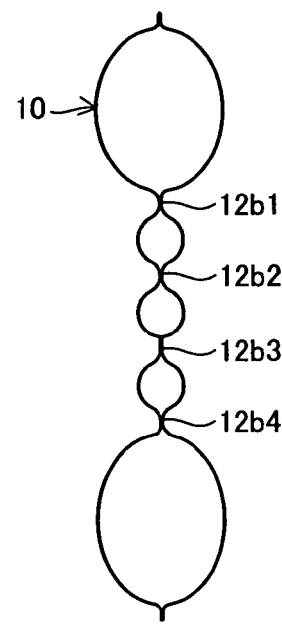
FIG. 7 is a sectional view of FIG. 6 taken along line S3-S3.

FIGS. 6 and 7 illustrate a second modification. In the second modification, a region of an airbag 10 which is thinner than other regions in the vehicle width direction in the inflated state is provided at a position corresponding to the chest Bb and the abdomen Bc of the occupant B by forming four uninflatable sections 12b1 to 12b4 in the airbag 10. Each of the uninflatable sections 12b1 to 12b4 is formed by partially bonding a folded airbag material, and extends substantially perpendicular to the seat back Aa.

Figure 8:
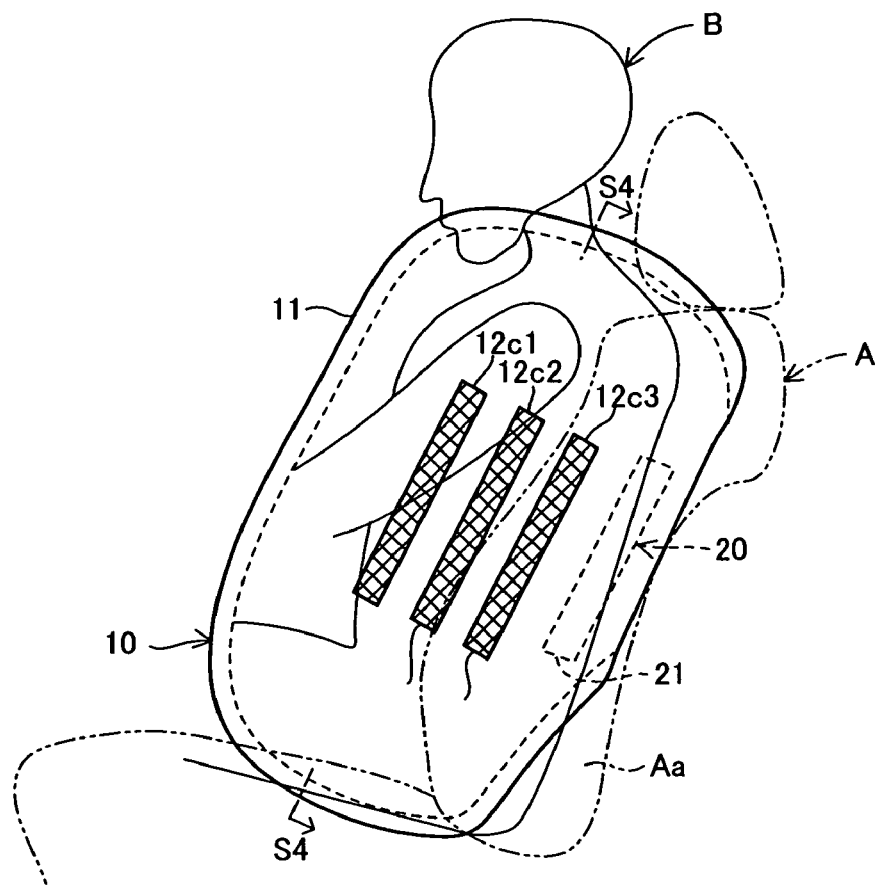
FIG. 8 is a side view schematically illustrating a third modification of the first embodiment.
Figure 9:
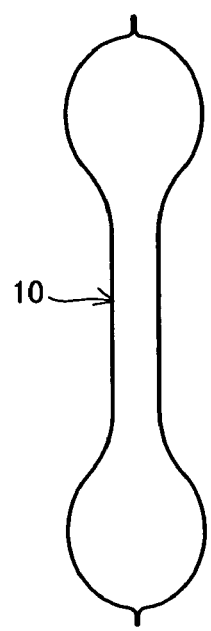
FIG. 9 is a sectional view of FIG. 8 taken along line S4-S4.

FIGS. 8 and 9 illustrate a third modification. In the third modification, a region of an airbag 10 which is thinner than other regions in the vehicle width direction in the inflated state is provided at a position corresponding to the chest Bb and the abdomen Bc of the occupant B by forming three uninflatable sections 12c1 to 12c3 in the airbag 10. Each of the uninflatable sections 12c1 to 12c3 is formed by partially bonding a folded airbag material, and extends substantially parallel to the seat back Aa. In the third modification, an inflator 20 having only a gas discharge hole 21 at the bottom end is used.

Figure 10:
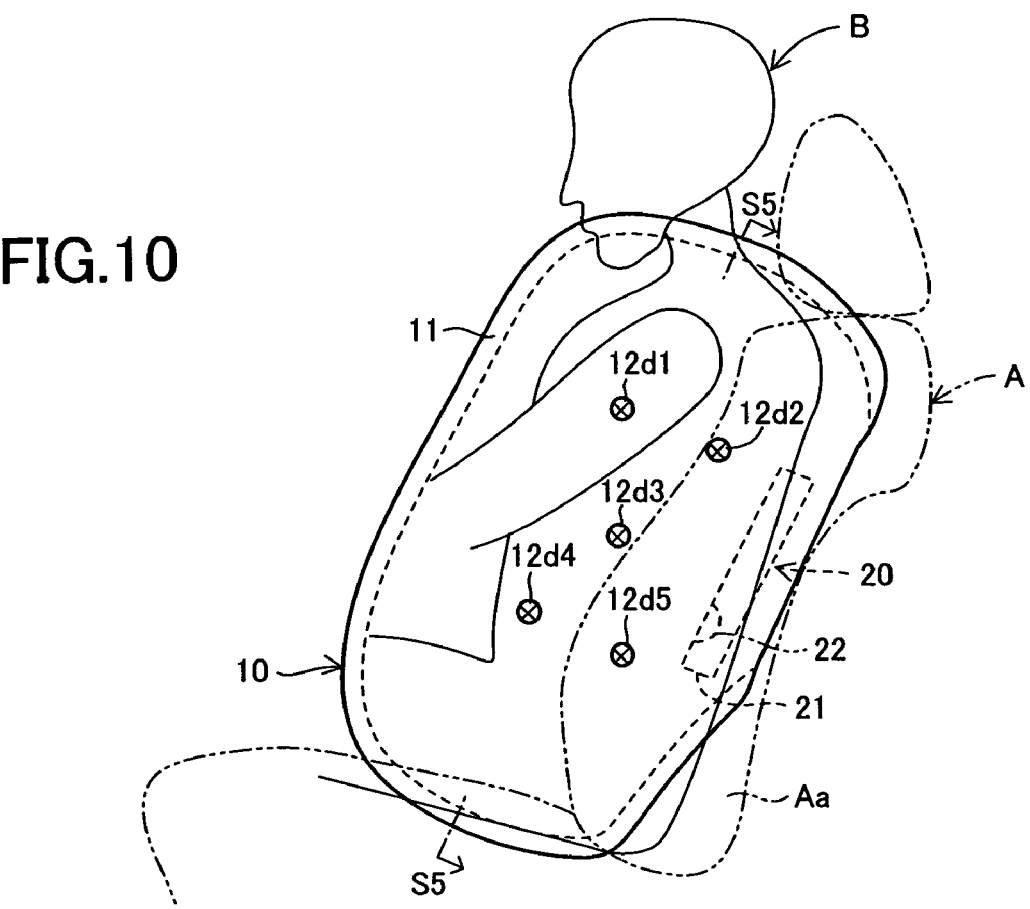
FIG. 10 is a side view schematically illustrating a fourth modification of the first embodiment.
Figure 11:
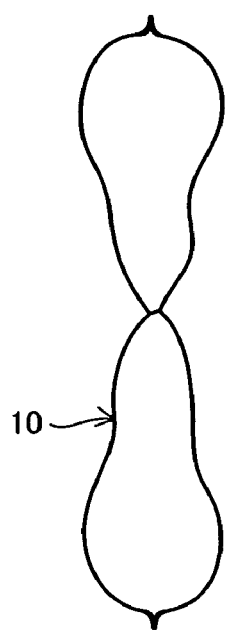
FIG. 11 is a sectional view of FIG. 10 taken along line S5-S5.

FIGS. 10 and 11 illustrate a fourth modification. In the fourth modification, a region of an airbag 10 which is thinner than other regions in the vehicle width direction in the inflated state is provided at a position corresponding to the chest Bb and the abdomen Bc of the occupant B by forming five uninflatable sections 12d1 to 12d5 in the airbag 10. Each of the uninflatable sections 12d1 to 12d5 is formed by partially bonding a folded airbag material, and is substantially circular in side view.

Figure 12:
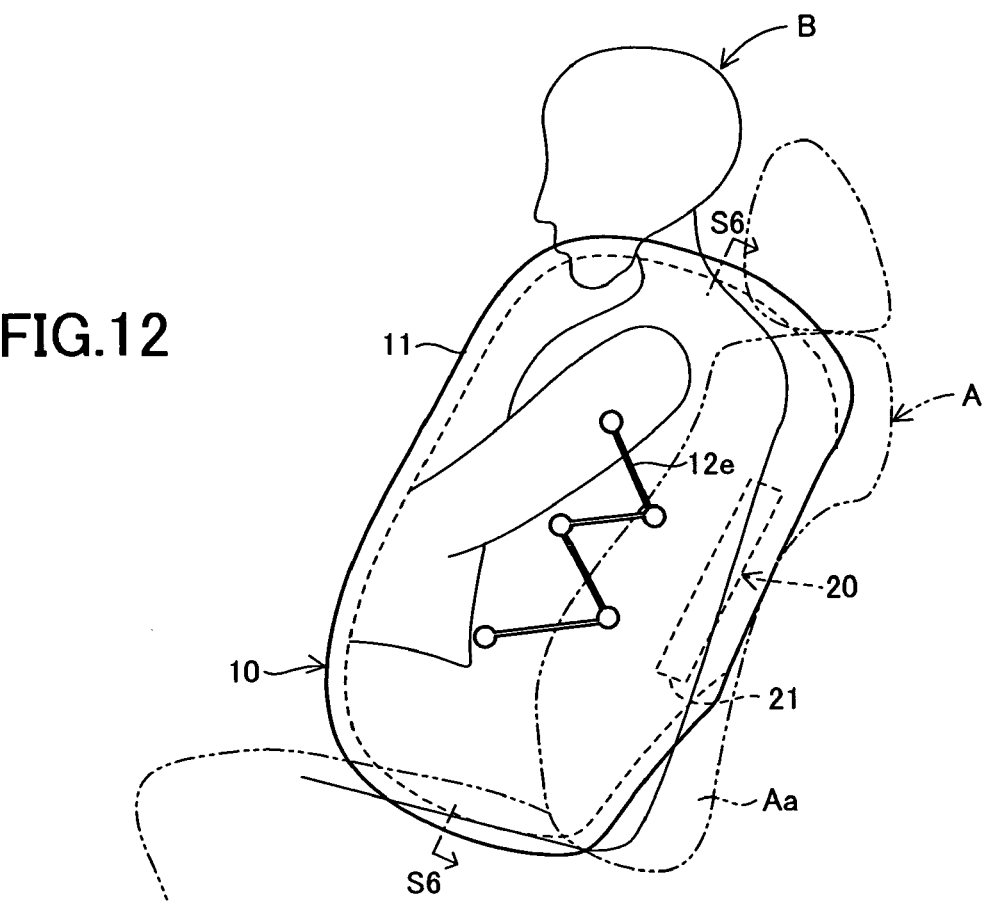
FIG. 12 is a side view schematically illustrating a fifth modification of the first embodiment.
Figure 13:
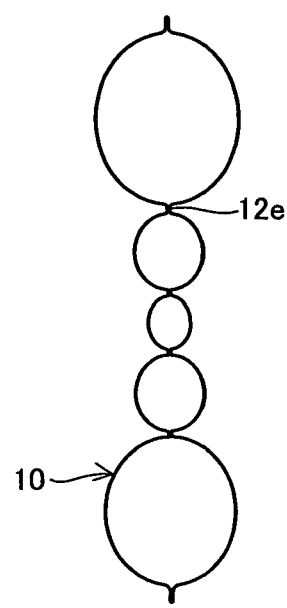
FIG. 13 is a sectional view of FIG. 12 taken along line S6-S6.

FIGS. 12 and 13 illustrate a fifth modification. In the fifth modification, a region of an airbag 10 which is thinner than other regions in the vehicle width direction in the inflated state is provided at a position corresponding to the chest Bb and the abdomen Bc of the occupant B by forming an uninflatable section 12e in the airbag 10. The uninflatable section 12e is formed by partially bonding a folded airbag material, and extends in a zigzag fashion in side view. In the fifth modification, an inflator 20 having only a gas discharge hole 21 at the bottom end is used.

Figure 14:
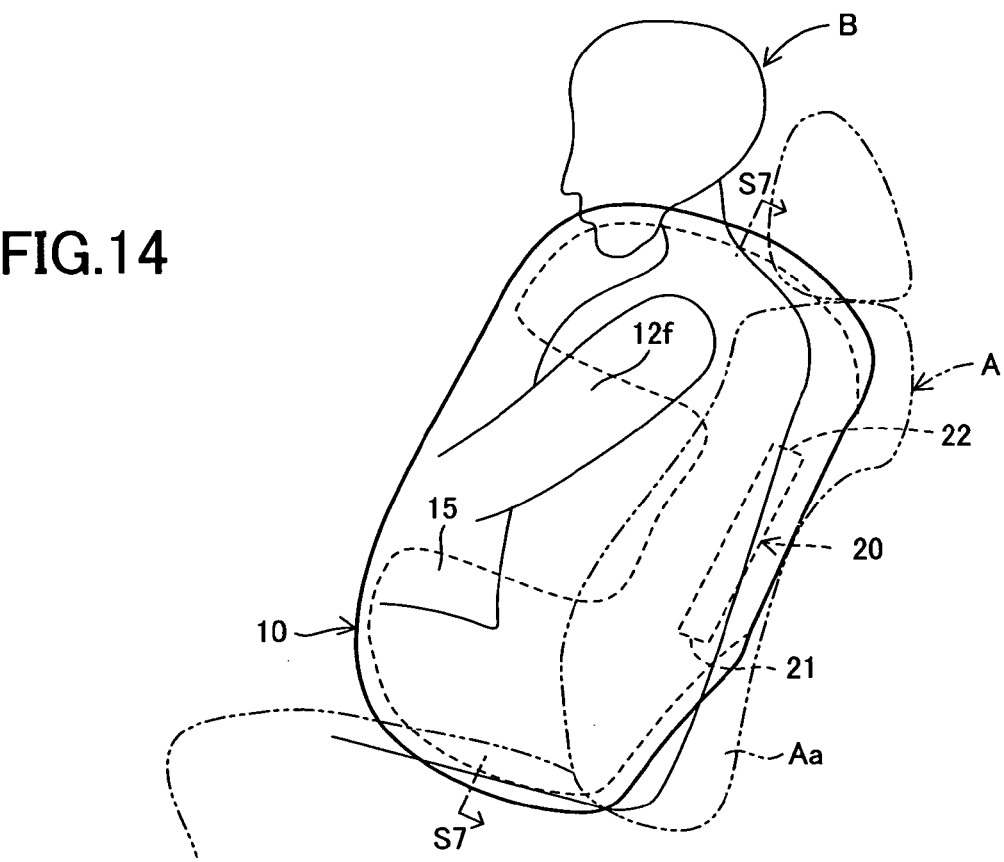
FIG. 14 is a side view schematically illustrating a sixth modification of the first embodiment.
Figure 15:
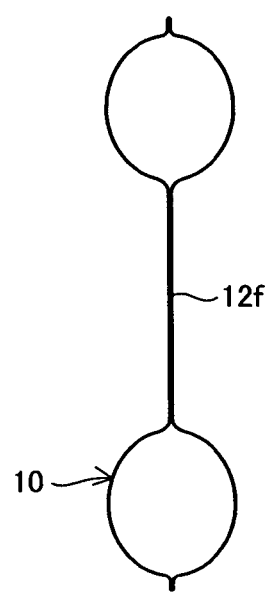
FIG. 15 is a sectional view of FIG. 14 taken along line S7-S7.

FIGS. 14 and 15 illustrate a sixth modification. In the sixth modification, a region of an airbag 10 which is thinner than other regions in the vehicle width direction in the inflated state is provided at a position corresponding to the chest Bb and the abdomen Bc of the occupant B by forming an uninflatable section 12f in the airbag 10. The uninflatable section 12f is formed by partially bonding a folded airbag material in such a manner that an inflatable body 15 of the airbag 10 is shaped like a bracket facing front. In the sixth modification, an inflator 20 having gas discharge holes 21 and 22 at the bottom and top ends, respectively, is used.

Figure 16:
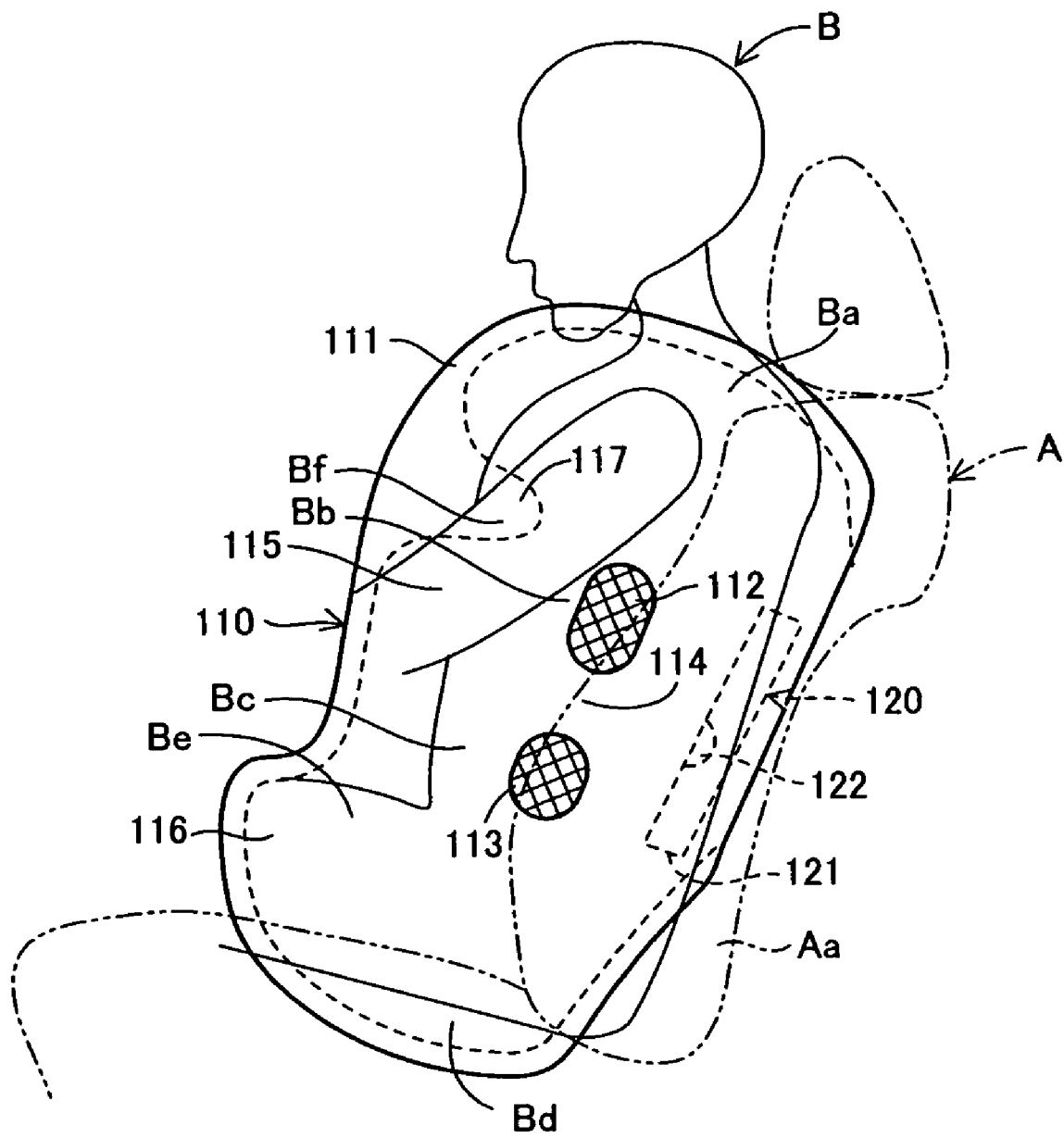
FIG. 16 is a side view schematically illustrating an occupant protection device according to a second embodiment of the present invention.

In the above-described embodiment and modifications thereof, the airbag 10 protects the body of the occupant B from the shoulder Ba to the lumbar Bd. However, as in a second embodiment that is schematically shown in FIG. 16, an airbag 110 may include an inflatable body 116 that is integrated with an inflatable body 115 at the bottom of the airbag 110, the inflatable body 116 being inflatable at the side of the thigh Be of the occupant B. In this case, the airbag 110 protects the body of the occupant B from the shoulder Ba to the lumbar Bd and the thigh Be.

In addition, in the second embodiment, the airbag 110 has an uninflatable section 117 at a position corresponding to the upper arm Bf of the occupant B, and accordingly an additional region that is thin in the vehicle width direction in the inflated state is provided. The other structures of the second embodiment are the same as those of the first embodiment. Therefore, similar components are denoted by reference numerals obtained by adding 100 to those of the first embodiment, and explanations thereof are thus omitted.

In the second embodiment that is structured as described above, effects similar to those of the first embodiment are, of course, obtained. In addition, in the second embodiment, the airbag 110 that is inflated at the side of the occupant B when a side collision or the like of the vehicle occurs includes the inflatable body 116 that is integrated with the inflatable body 115 at the bottom of the airbag 110, the inflatable body 116 being inflated at the side of the thigh Be of the occupant B. Accordingly, the thigh Be of the occupant B is also pushed by the airbag 110 when a side collision or the like of the vehicle occurs. Therefore, when a side collision or the like of the vehicle occurs, the occupant B is pushed and moved toward the center of the vehicle cabin in the vehicle width direction without receiving a large load at the chest Bb and the abdomen Bc.

In addition, in the second embodiment, the airbag 110 has an additional region that is thin in the vehicle width direction in the inflated state at a position corresponding to the upper arm Bf of the occupant B. Therefore, when a side collision or the like of the vehicle occurs, the occupant B is pushed and moved toward the center of the vehicle cabin in the vehicle width direction without receiving a large load at the chest Bb, the abdomen Bc, and the upper arm Bf.

In the above-described first and second embodiments, the region of the airbag 10 or 110 which is thinner than other regions in the vehicle width direction in the inflated state is formed at a position corresponding to the chest Bb and the abdomen Bc of the occupant B. Accordingly, when a side collision or the like of the vehicle occurs, the occupant B is pushed and moved toward the center of the vehicle cabin in the vehicle width direction without receiving a large load at the chest Bb and the abdomen Bc. However, structures of a third embodiment schematically shown in FIGS. 17 and 18(a), a fourth embodiment schematically shown in FIG. 20, a fifth embodiment schematically shown in FIG. 21, a sixth embodiment schematically shown in FIG. 22, and a seventh embodiment schematically shown in FIG. 23 may also be applied.

Figure 17:
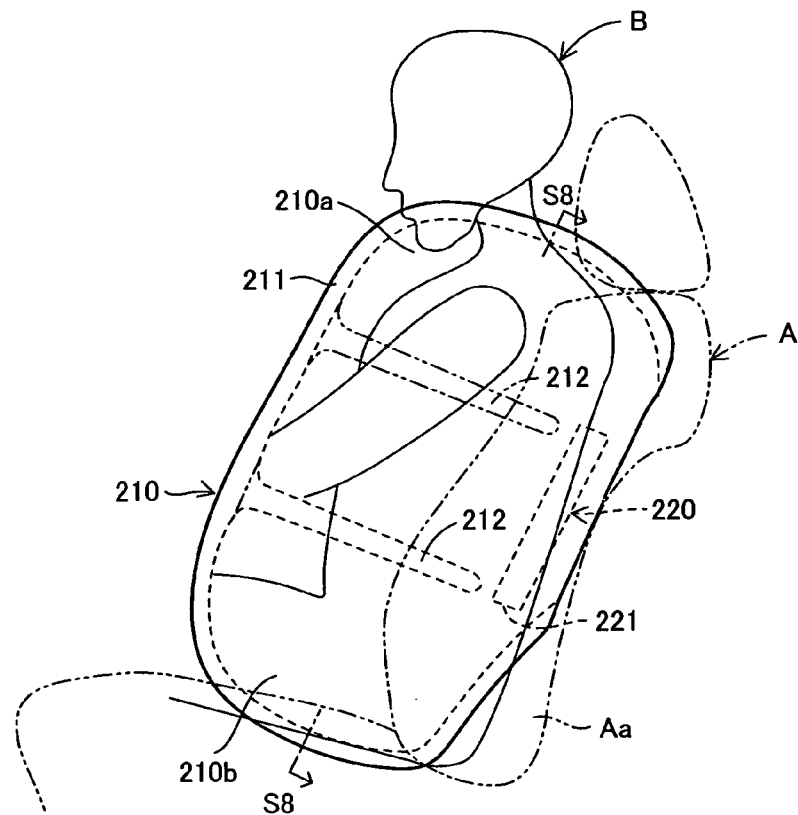
FIG. 17 is a side view schematically illustrating an occupant protection device according to a third embodiment of the present invention.
Figure 18:
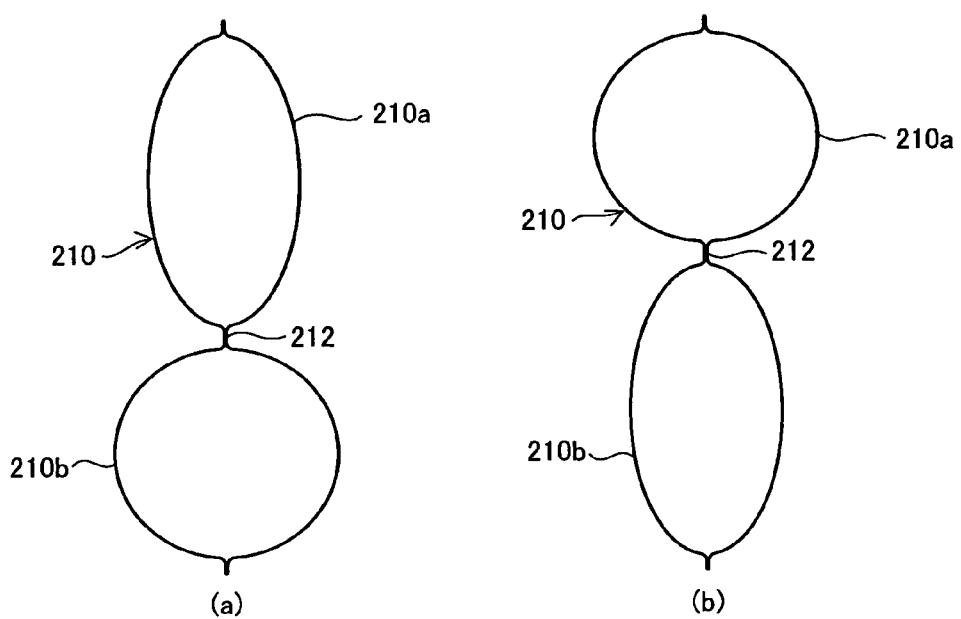
FIG. 18 is a sectional view of FIG. 17 taken along line S8-S8.

In the third embodiment shown in FIGS. 17 and 18(a), gas-pressure controlling means is provided for setting the inner pressure of a lower portion 210b of an airbag 210 (portion corresponding to the lumbar Bd of the occupant B) higher than that of other portions. Accordingly, when a side collision or the like of the vehicle occurs, the occupant B is pushed and moved toward the center of the vehicle cabin in the vehicle width direction without receiving a large load at the chest Bb and the abdomen Bc.

In addition, in the third embodiment shown in FIGS. 17 and 18(a), the gas-pressure controlling means for setting the inner pressure of the lower portion 210b of the airbag 210 higher than that of other portions includes a partition wall 212 formed in the airbag 210 and an inflator 220 having a gas discharge hole 221 only at the bottom end. The partition wall 212 is formed by partially bonding a folded airbag material and extends in the front-rear direction. The rear end of the partition wall 212 is near the inflator 220, and accordingly the partition wall 212 regulates an upward gas flow.

Therefore, according to the third embodiment, when a side collision or the like of the vehicle occurs, the lumbar Bd of the occupant B, which comes into contact with the lower portion 210b of the airbag 210, is quickly moved by being pushed with a large gas pressure. Accordingly, when a side collision or the like of the vehicle occurs, the occupant B is quickly pushed and moved toward the center of the vehicle cabin in the vehicle width direction without receiving a large load at the chest Bb and the abdomen Bc.

In the third embodiment, as shown in FIG. 18(a), the lower portion 210b of the airbag 210 is thicker than other portions in the vehicle width direction in the inflated state. Accordingly, when a side collision or the like of the vehicle occurs, the lumbar Bd of the occupant B, which comes into contact with the lower portion 210b of the airbag 210, is largely moved. Therefore, when a side collision or the like of the vehicle occurs, the occupant B is largely pushed and moved toward the center of the vehicle cabin in the vehicle width direction without receiving a large load at the chest Bb and the abdomen Bc.

In the above-described third embodiment, the inner pressure of the lower portion 210b of the airbag 210 is set to be higher than that of other portions. Alternately, however, a vertically inverted structure shown in FIG. 18(b) and FIG. 17 in which the corresponding partition wall 212 is shown by an imaginary line may also be applied. In this case, the inner pressure of an upper portion 210a of the airbag 210 is set to be higher than that of other portions.

In this case, when a side collision or the like of the vehicle occurs, the shoulder Ba of the occupant B, which comes into contact with the upper portion 210a of the airbag 210, is quickly moved by being pushed with a large gas pressure. Accordingly, when a side collision or the like of the vehicle occurs, the occupant B is quickly pushed and moved toward the center of the vehicle cabin in the vehicle width direction without receiving a large load at the chest Bb and the abdomen Bc.

In this case, the upper portion 210a of the airbag 210 is thicker than other portions in the vehicle width direction in the inflated state. Accordingly, when a side collision or the like of the vehicle occurs, the shoulder Ba of the occupant B, which comes into contact with the upper portion 210a of the airbag 210 is largely moved. Therefore, when a side collision or the like of the vehicle occurs, the occupant B is largely pushed and moved toward the center of the vehicle cabin in the vehicle width direction without receiving a large load at the chest Bb and the abdomen Bc.

Figure 19:
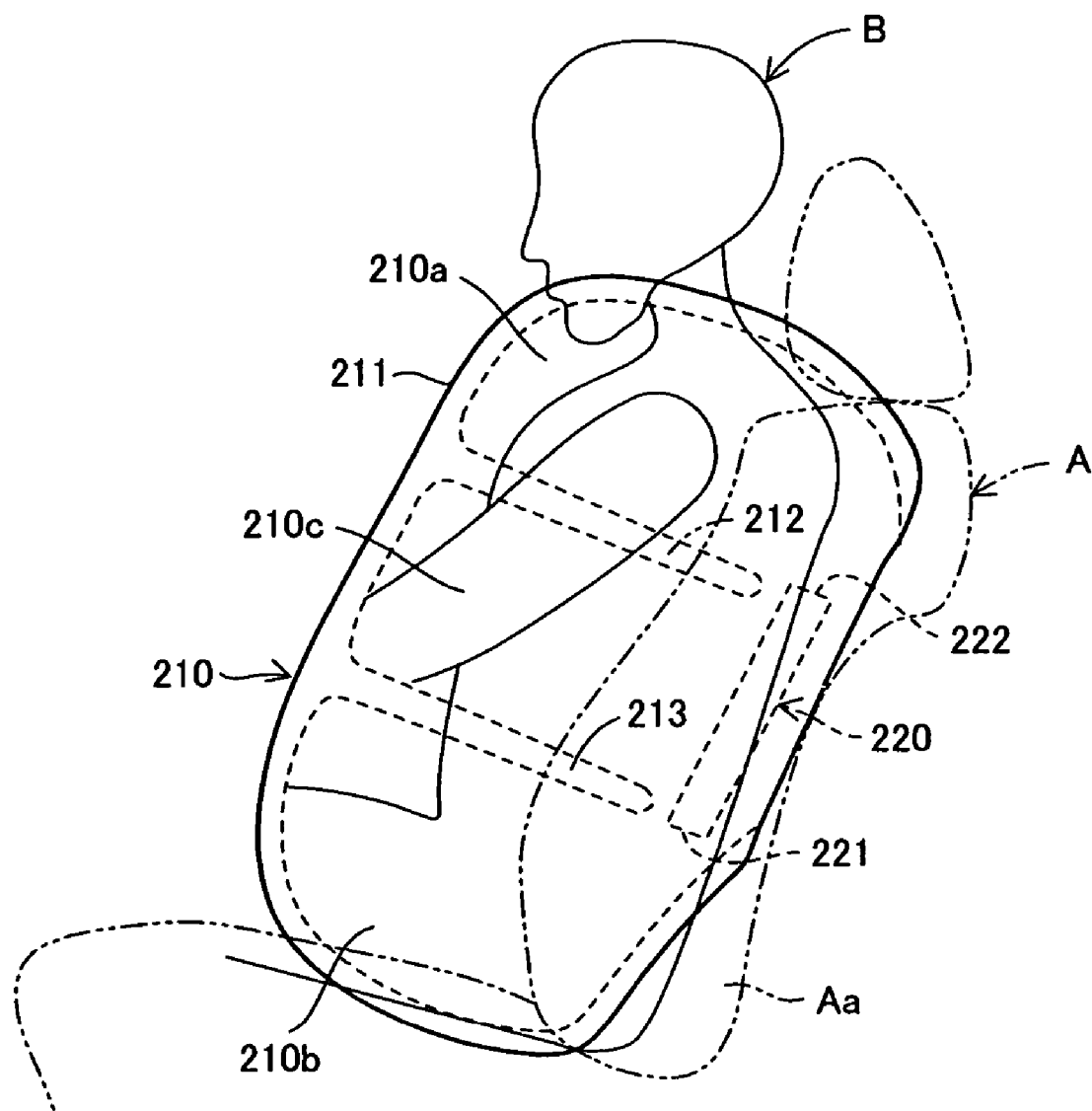
FIG. 19 is a side view schematically illustrating a modification of the third embodiment.

In the above-described third embodiment, the inner pressure of the lower portion 210b of the airbag 210 is set to be higher than that of other portions. Alternately, however, the structure shown in FIG. 19 may also be applied. In FIG. 19, an airbag 210 includes upper and lower partition walls 212 and 213, and an inflator 220 having gas discharge holes 221 and 222 at the bottom and top ends, respectively, is used. The inner pressures of upper and lower portions 210a and 210b of the airbag 210 are set higher than that of a middle portion 210c.

Figure 20:
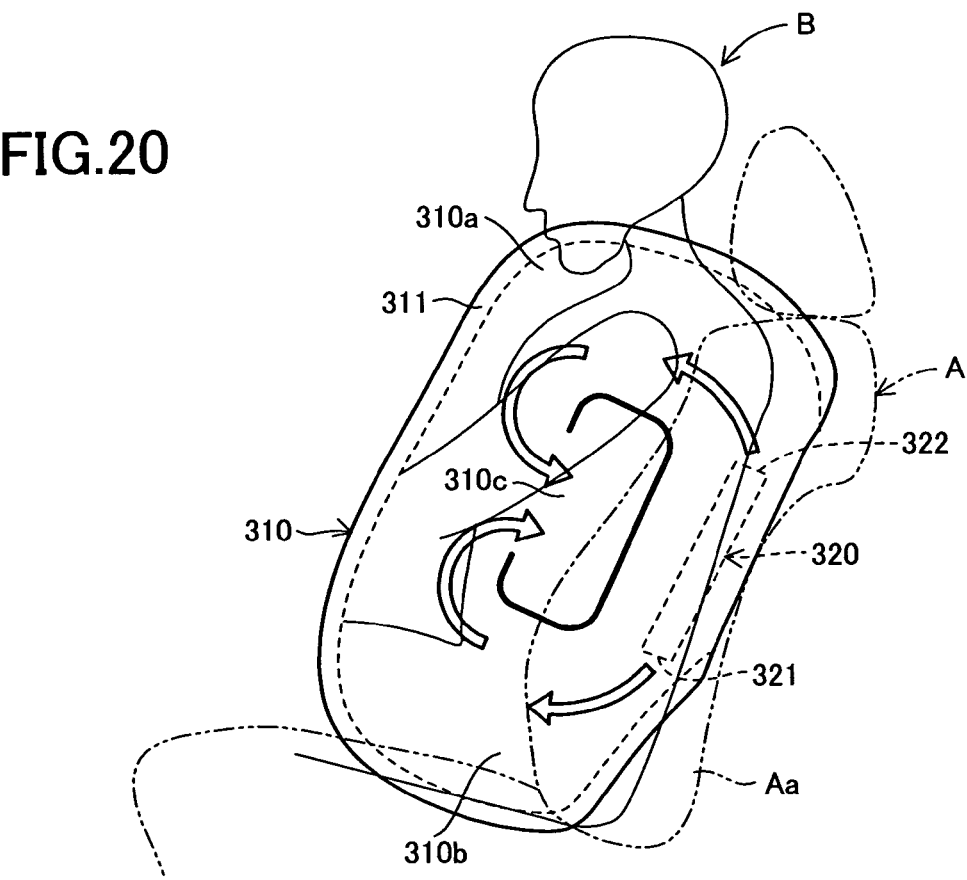
FIG. 20 is a side view schematically illustrating an occupant protection device according to a fourth embodiment of the present invention.

In the fourth embodiment shown in FIG. 20, inflation controlling means is provided for inflating an upper portion 310a and a lower portion 310b of an airbag 310 before other portions (a vertical center portion 310c extending approximately parallel to the seat back Aa). Accordingly, when a side collision or the like of the vehicle occurs, the occupant B is pushed and moved toward the center of the vehicle cabin in the vehicle width direction without receiving a large load at the chest Bb and the abdomen Bc.

In addition, in the fourth embodiment shown in FIG. 20, the inflation controlling means for inflating the upper and lower portions 310a and 310b of the airbag 310 before other portions includes a guide wall 312 formed in the airbag 310 and an inflator 320 having gas discharge holes 321 and 322 at the bottom and top ends, respectively. The guide wall 312 of the airbag 310 sections the upper portion 310a, the lower portion 310b, and the vertical center portion 310c from one other and functions as gas-flow regulating means for causing gas to flow into the upper and lower portions 310a and 310b of the airbag 310 first and then into the vertical center portion 310c. The guide wall 312 is formed in the airbag 310 by sewing the airbag 310.

Therefore, in the fourth embodiment, when a side collision or the like of the vehicle occurs, the shoulder Ba and the lumbar Bd of the occupant B, which come into contact with the upper and lower portions 310a and 310b, respectively, of the airbag 310, are pushed before the chest Bb and the abdomen Bc of the occupant B. Therefore, when a side collision or the like of the vehicle occurs, the occupant B is pushed and moved toward the center of the vehicle cabin in the vehicle width direction without receiving a large load at the chest Bb and the abdomen Bc.

In addition, in the fourth embodiment, the vertical center portion 310c, which is inflated after the upper and lower portions 310a and 310b of the airbag 310, extends substantially parallel to the seat back Aa. Therefore, this portion can be positioned along the side of the occupant B from the chest Bb to the abdomen Bc. Accordingly, the load applied to the chest Bb and the abdomen Bc of the occupant B when a side collision or the like of the vehicle occurs is reliably reduced.

In addition, in the fourth embodiment, the inflation controlling means for inflating the upper and lower portions 310a and 310b of the airbag 310 before other portions is the gas-flow regulating means for causing the gas to flow into the upper and lower portions 310a and 310b of the airbag 310 first and then into the vertical center portion 310c, and the gas-flow regulating means includes the guide wall 312 formed in the airbag 310 by sewing the airbag 310. Thus, the inflation controlling means is easily formed.

In the above-described fourth embodiment, the upper and lower portions 310a and 310b of the airbag 310 are inflated before the vertical center portion 310c. Alternatively, however, one of the upper and lower portions 310a and 310b of the airbag 310 may be inflated before the vertical center portion 310c.

Figure 21:
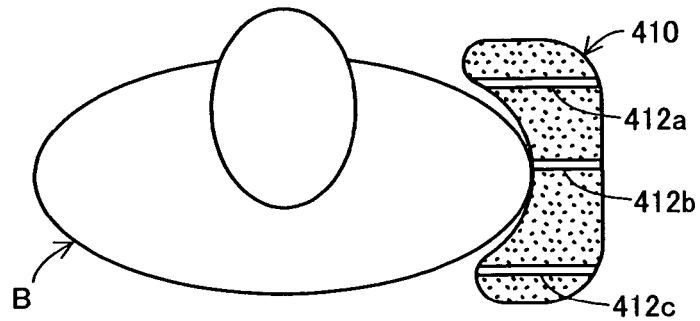
FIG. 21 is a horizontally sectioned plan view schematically illustrating the major part of an occupant protection device according to a fifth embodiment of the present invention.

In the fifth embodiment shown in FIG. 21, an airbag 410 is provided with shape adjusting means for adjusting the shape of the airbag 410 so that the side of the airbag 410 facing the occupant B extends along the side of the occupant B. More specifically, a plurality of straps 412a, 412b, and 412c extend in the vehicle width direction in the airbag 410. Each of the straps 412a, 412b, and 412c is fixed to the airbag 410 at both ends thereof.

Therefore, in the fifth embodiment, the occupant B is prevented from receiving a local load from the airbag 410. Accordingly, not only the load applied to the shoulder Ba and the lumbar Bd of the occupant B when a side collision or the like of the vehicle occurs but also the load applied to the chest Bb and the abdomen Bc of the occupant B is reliably reduced. In addition, in the fifth embodiment, since the shape adjusting means includes a plurality of straps 412a, 412b, and 412c, the shape adjusting means is easily formed.

Figure 22:
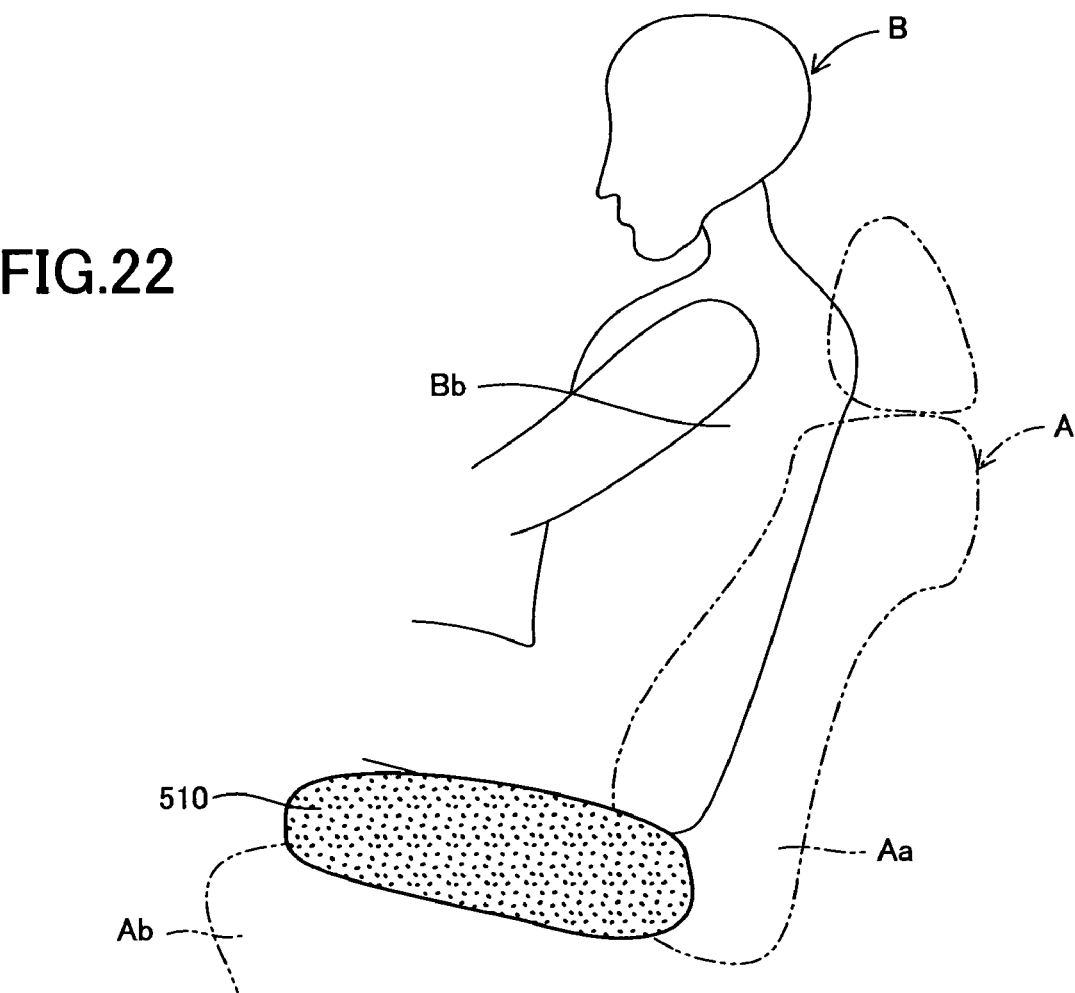
FIG. 22 is a vertically sectioned plan view schematically illustrating the major part of an occupant protection device according to a sixth embodiment of the present invention.

In the sixth embodiment shown in FIG. 22, an airbag 510 is provided in a seat cushion Ab of the seat A. The airbag 510 moves the occupant B upward in the inflated state. Therefore, in the sixth embodiment, when a side collision or the like of the vehicle occurs, the chest Bb of the occupant B is prevented from encountering a projecting portion on the vehicle, for example, an armrest (not shown) provided on the door. Thus, the load applied to the chest Bb of the occupant B is reduced.

Figure 23:
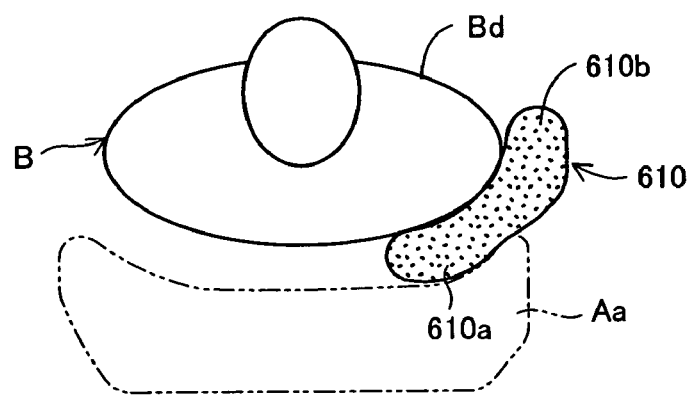
FIG. 23 is a horizontally sectioned plan view schematically illustrating the major part of an occupant protection device according to a seventh embodiment of the present invention.

In the seventh embodiment shown in FIG. 23, an airbag 610 is provided in the seat back Aa. The airbag 610 includes a first inflatable body 610a that inflates between the seat back Aa and the back of the occupant B along the edge adjacent to the door and a second inflatable body 610b that inflates between the door (not shown) and the side of the occupant B adjacent to the door. The airbag 610 moves the chest Bb of the occupant B diagonally to the front away from the door.

Accordingly, in the seventh embodiment, when a side collision or the like of the vehicle occurs, the first and second inflatable bodies 610a and 610b of the airbag 610 reliably move the chest Bb of the occupant B diagonally to the front away from the door. Thus, the chest Bb of the occupant B is reliably prevented from encountering the armrest provided on the vehicle door. In addition, the second inflatable body 610b of the airbag 610 serves to reduce the load applied to the occupant B from the door.

Figure 24:
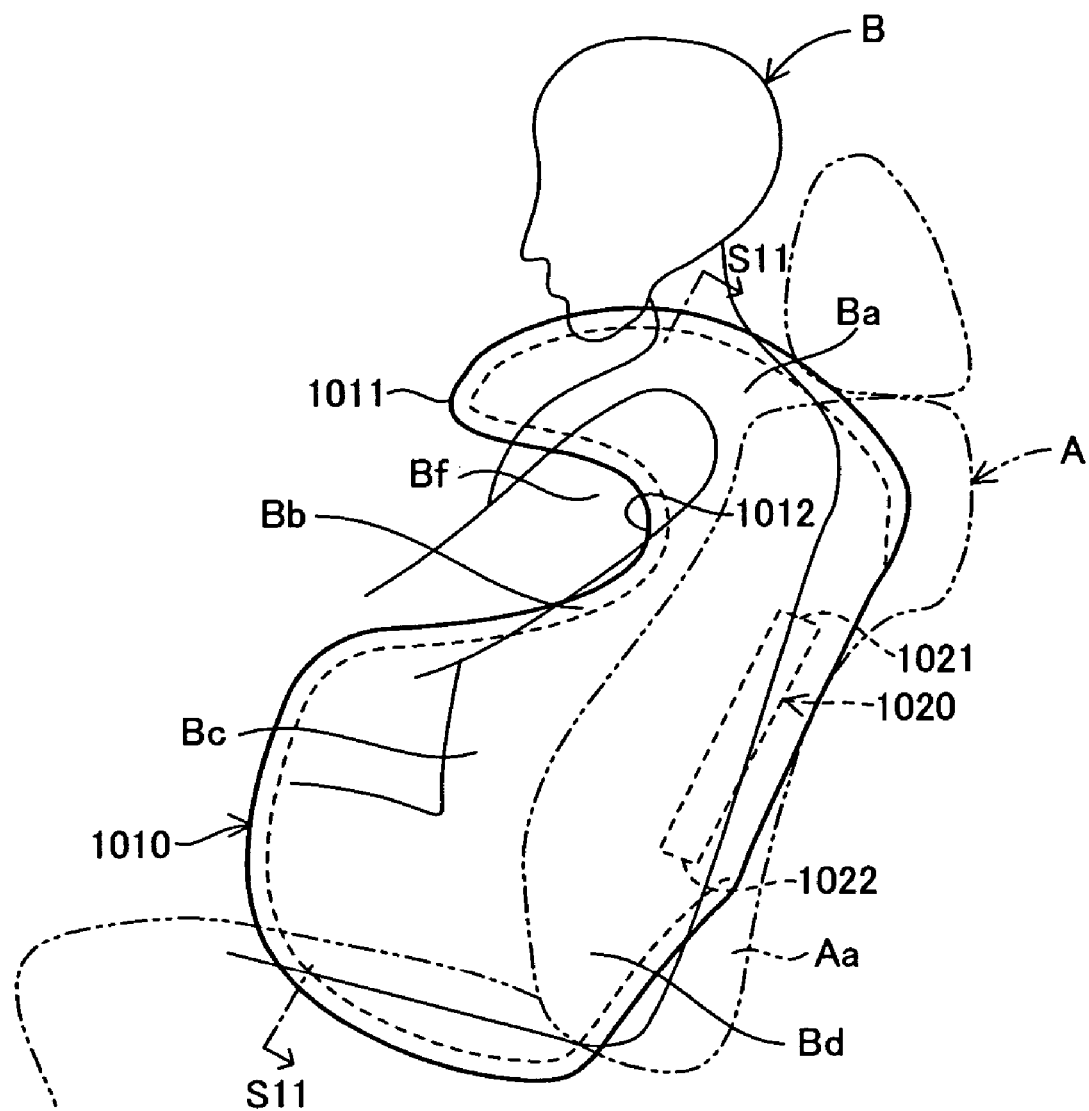
FIG. 24 is a side view schematically illustrating an occupant protection device according to an eighth embodiment of the present invention.
Figure 25:
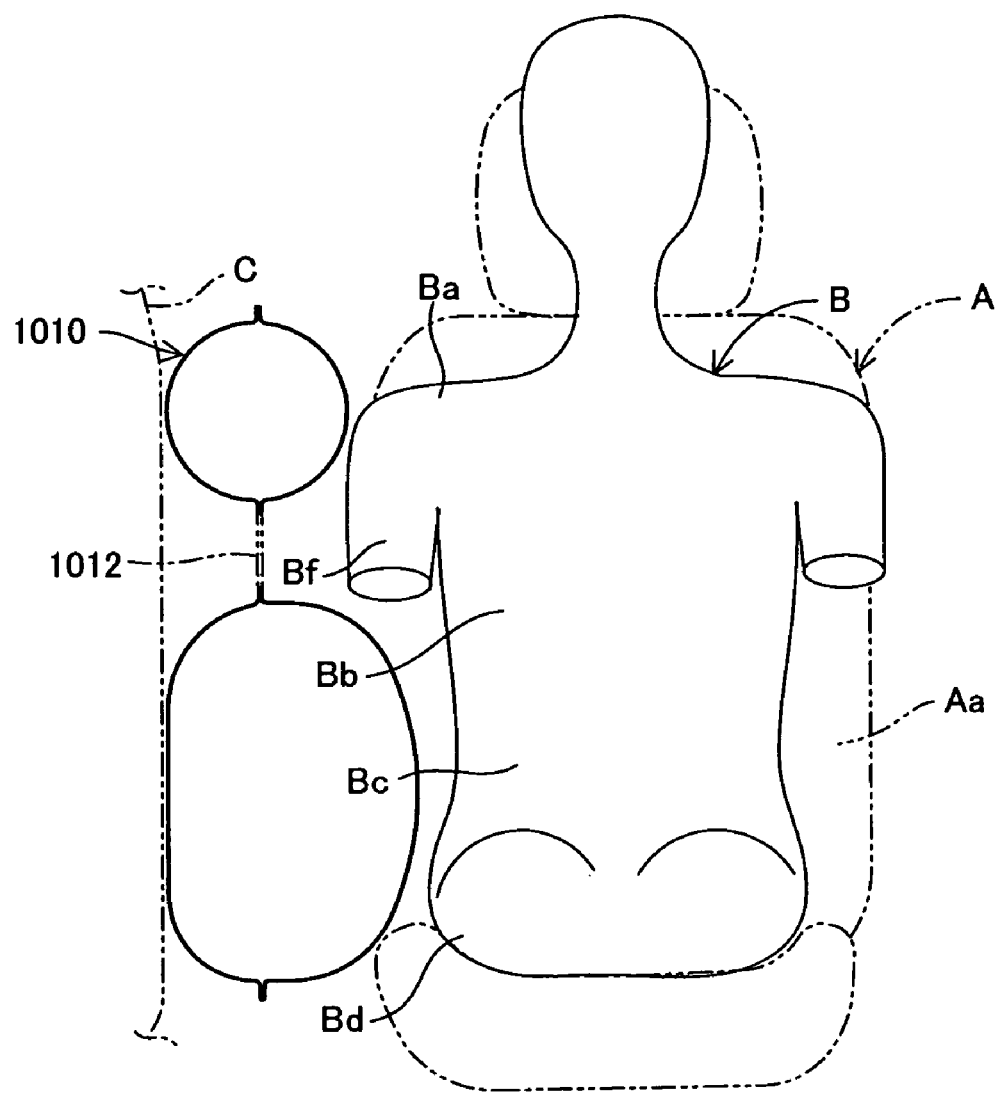
FIG. 25 is a vertical sectional view of FIG. 24 taken along line S1-S1.

FIGS. 24 and 25 schematically illustrate an occupant protection device according to an eighth embodiment of the present invention. The occupant protection device according to the eighth embodiment is attached to a seat back Aa of a seat A of a vehicle and includes an airbag 1010 disposed such that the airbag 1010 can be inflated at the side of an occupant B which is adjacent to a door C and an inflator 1020 that supplies gas to the airbag 1010.

When a side collision or the like of the vehicle occurs, the airbag 1010 is inflated at the side of the occupant B adjacent to the door C with gas supplied from the inflator 1020, as shown in FIGS. 24 and 25. Thus, the airbag 1010 protects the side of the occupant B in a region from the shoulder Ba to the lumbar Bd including the chest Bb and the abdomen Bc. Normally, the airbag 1010 is stored in the seat back Aa in a folded state.

In addition, the airbag 1010 is formed in a bag-like shape by folding an airbag material with a predetermined shape in half and airtightly bonding a peripheral region 1011 thereof. The airbag 1010 has a recess 1012 for receiving a projecting portion of the occupant B, i.e., the upper arm Bf that projects in the vehicle width direction from the side of the occupant B facing the door C, in the inflated state. The recess 1012 of the airbag 1010 is formed by cutting out the corresponding portion of the airbag 1010 in advance.

The inflator 1020 is activated and supplies gas to the airbag 1010 when a side collision or the like of the vehicle occurs (such a situation is detected by a sensor (not shown)). The inflator 1020 is disposed in the airbag 1010 and has gas discharge holes 1021 and 1022 at the top and bottom ends, respectively. The gas discharge hole 1021 faces upward to discharge the gas upward, and the gas discharge hole 1022 faces downward to discharge the gas downward.

In the occupant protection device according to the eighth embodiment that is structured as described above, if a side collision or the like of the vehicle occurs, the inflator 1020 is activated when an acceleration detected by a corresponding sensor (not shown) exceeds a set value. Accordingly, the gas is supplied to the airbag 1010 through the gas discharge holes 1021 and 1022 of the inflator 1020, and the airbag 1010 is inflated at the side of the occupant B. Thus, the airbag 1010 is placed between the vehicle door C and the body of the occupant B from the shoulder Ba to the lumbar Bd. Therefore, if a part of the vehicle body enters the vehicle cabin, the occupant B is pushed by the airbag 1010 toward the center of the vehicle cabin in the vehicle width direction, and the body of the occupant B from the shoulder Ba to the lumbar Bd is protected.

In the occupant protection device according to the eighth embodiment, the airbag 1010 has the recess 1012 for receiving the projecting portion of the occupant B, i.e., the upper arm Bf that projects in the vehicle width direction from the side of the occupant B facing the door C, in the inflated state. Therefore, in this occupant protection device, the recess 1012 of the airbag 1010 corresponding to the upper arm Bf of the occupant B prevents a particular part, for example, the chest Bb of the occupant B from being locally pressed by the upper arm Bf. Accordingly, when a side collision or the like of the vehicle occurs, a particular part, for example, the chest Bb of the occupant B is prevented from receiving a large local load.

In addition, in the occupant protection device according to the eighth embodiment, the recess 1012 of the airbag 1010 is formed by cutting out the corresponding portion of the airbag 1010 in advance. Accordingly, the volume and weight of the airbag material are reduced. Therefore, the airbag 1010 can be folded into a small package and be stored in a small space in the seat back Aa.

In the above-described eighth embodiment, the recess 1012 is formed by cutting out the corresponding portion of the airbag 1010 in advance. Alternatively, however, the recess may also be formed as in a modification schematically illustrated in FIGS. 26 to 28 or in a modification schematically illustrated in FIGS. 29 and 30.

Figure 26:
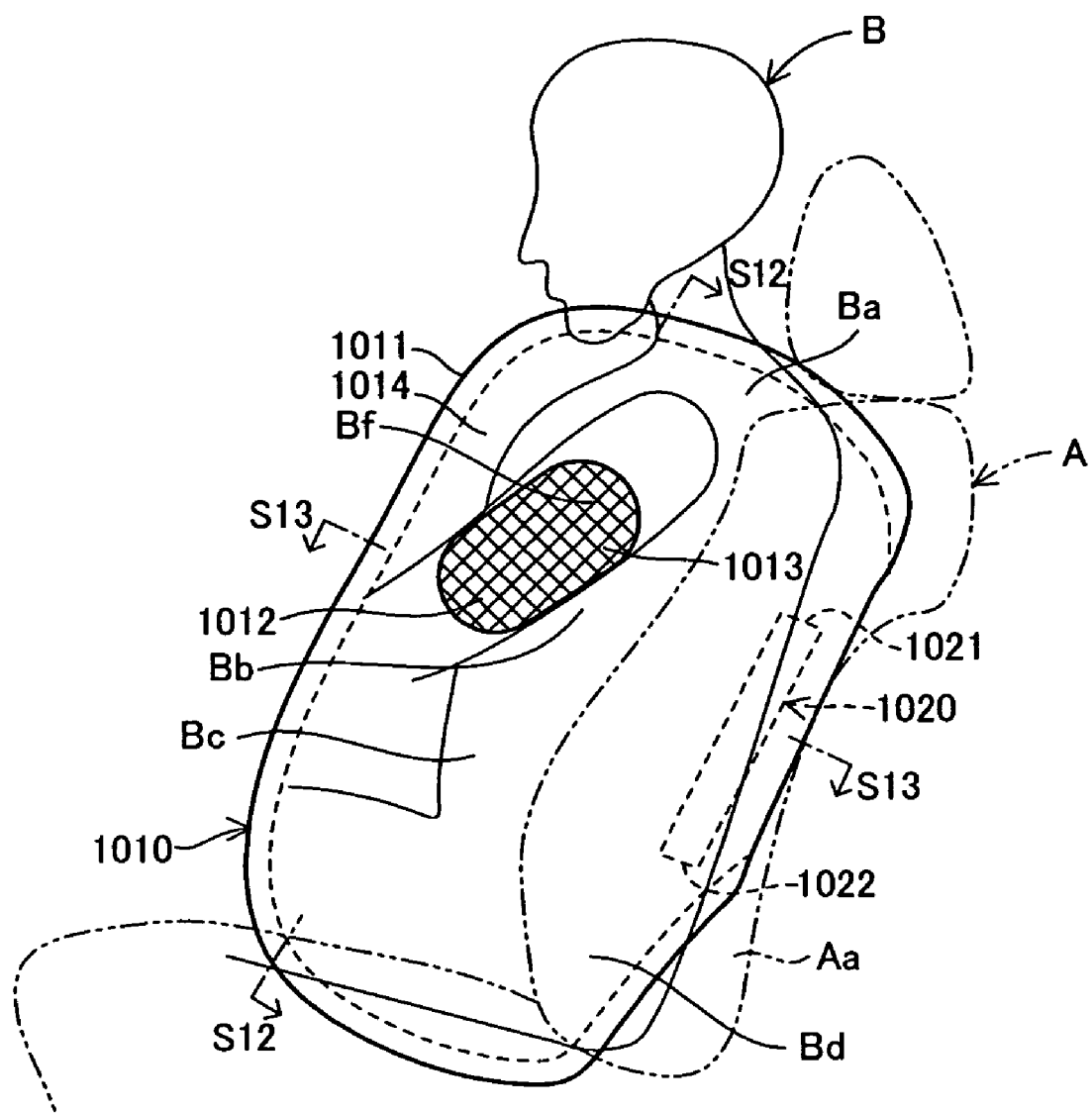
FIG. 26 is a side view schematically illustrating a first modification of the eighth embodiment.
Figure 27:
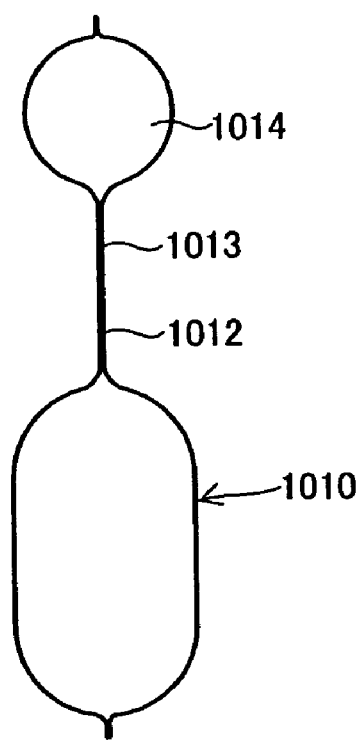
FIG. 27 is a vertical sectional view of FIG. 26 taken along line S12-S12.
Figure 28:
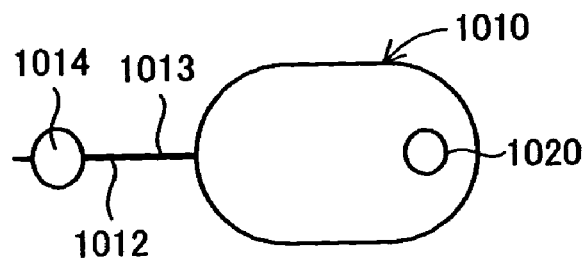
FIG. 28 is a horizontal sectional view of FIG. 26 taken along line S13-S13.

FIGS. 26 to 28 illustrate a first modification of the eighth embodiment. In the first modification, a recess 1012 of an airbag 1010 is formed of an oval uninflatable section 1013 provided at a position corresponding to the upper arm Bf of the occupant B. The oval uninflatable section 1013 is formed by partially bonding a folded airbag material, and is surrounded by an inflatable body 1014. Accordingly, in the first modification, the recess 1012 is formed in the airbag 1010 at the corresponding position without reducing the rigidity of the airbag 1010 in the inflated state.

Figure 29:
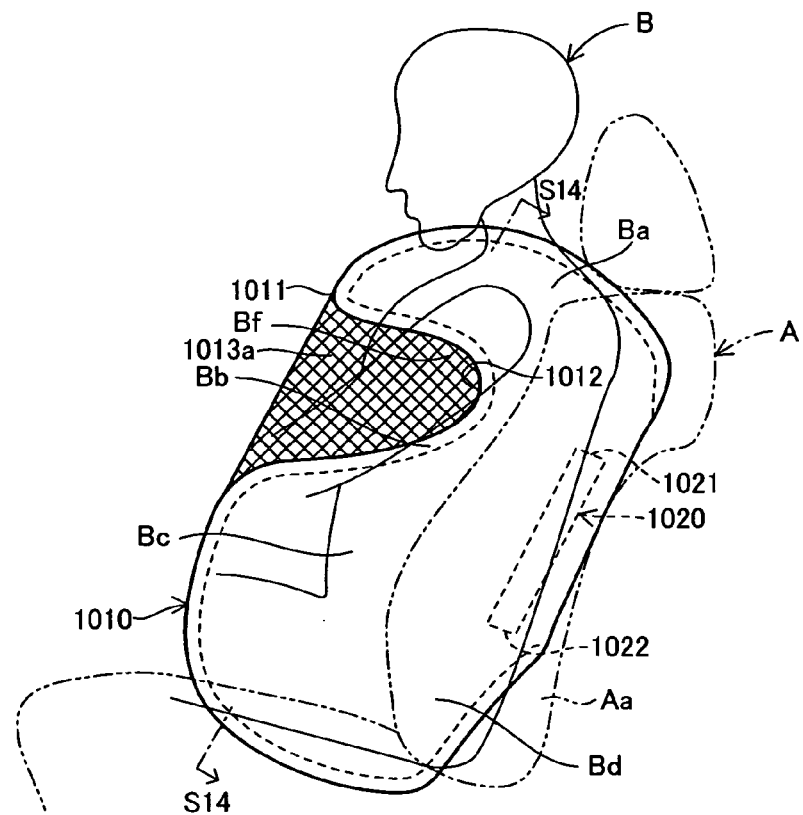
FIG. 29 is a side view schematically illustrating a second modification of the eighth embodiment.
Figure 30:
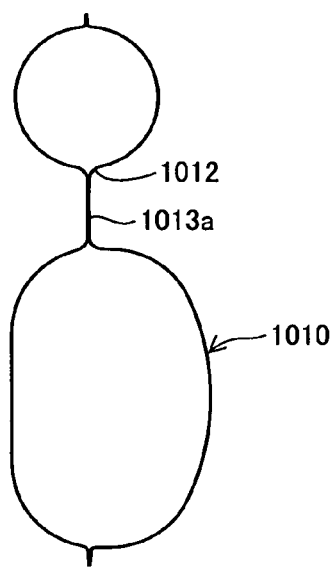
FIG. 30 is a vertical sectional view of FIG. 29 taken along line S14-S14.

FIGS. 29 and 30 illustrate a second modification of the eighth embodiment. In the second modification, a recess 1012 of an airbag 1010 is formed of an uninflatable section 1013a provided at a position corresponding to the upper arm Bf of the occupant B and extending to the front edge of the airbag 1010. The uninflatable section 1013a is formed by partially bonding a folded airbag material.

Figure 31:
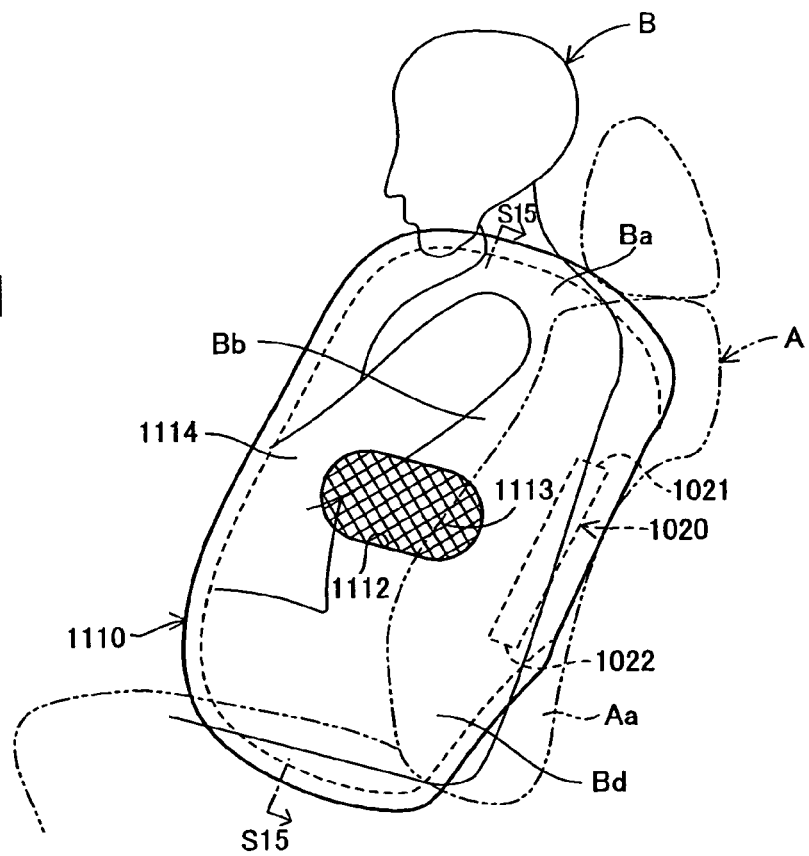
FIG. 31 is a side view schematically illustrating an occupant protection device according to a ninth embodiment of the present invention.
Figure 32:
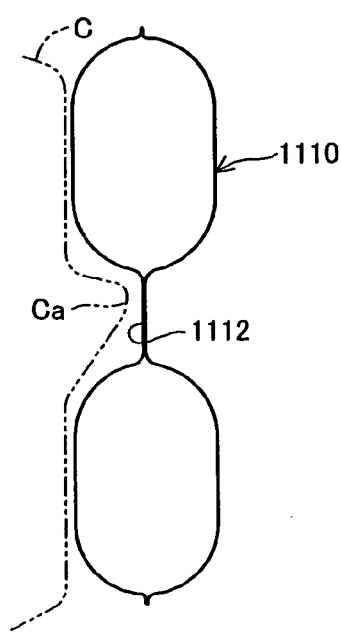
FIG. 32 is a vertical sectional view of FIG. 31 taken along line S15-S15.

In the above-described modifications, the airbag 1010 has the recess 1012 that can receive the upper arm Bf of the occupant B. Alternatively, however, as in a ninth embodiment schematically illustrated in FIGS. 31 and 32, a recess 1112 that can receive a projecting portion, e.g., an armrest Ca, on the inner side of a door C may also be formed in an airbag 1110. The recess 1112 in the airbag 1110 is formed of an oval uninflatable section 1113 provided at a position corresponding to the armrest Ca on the inner side of the door C. The oval uninflatable section 1113 is formed by partially bonding a folded airbag material, and is surrounded by an inflatable body 1114.

In the ninth embodiment, the airbag 1110 has the recess 1112 that receives the armrest Ca on the inner side of the door C in the inflated state. Therefore, the airbag 1110 is prevented from being pushed by the armrest Ca on the inner side of the door C, and the load applied to the chest Bb of the occupant B from the airbag 1110 is reduced. Accordingly, when a side collision or the like of the vehicle occurs, the chest Bb of the occupant B is prevented from receiving a large local load.

In addition, also in the ninth embodiment, the oval uninflatable section 1113 is surrounded by the inflatable body 1114. Therefore, similar to the first modification of the eighth embodiment, the recess 1112 is formed in the airbag 1110 at the corresponding position without reducing the rigidity of the airbag 1110 in the inflated state.

Figure 33:
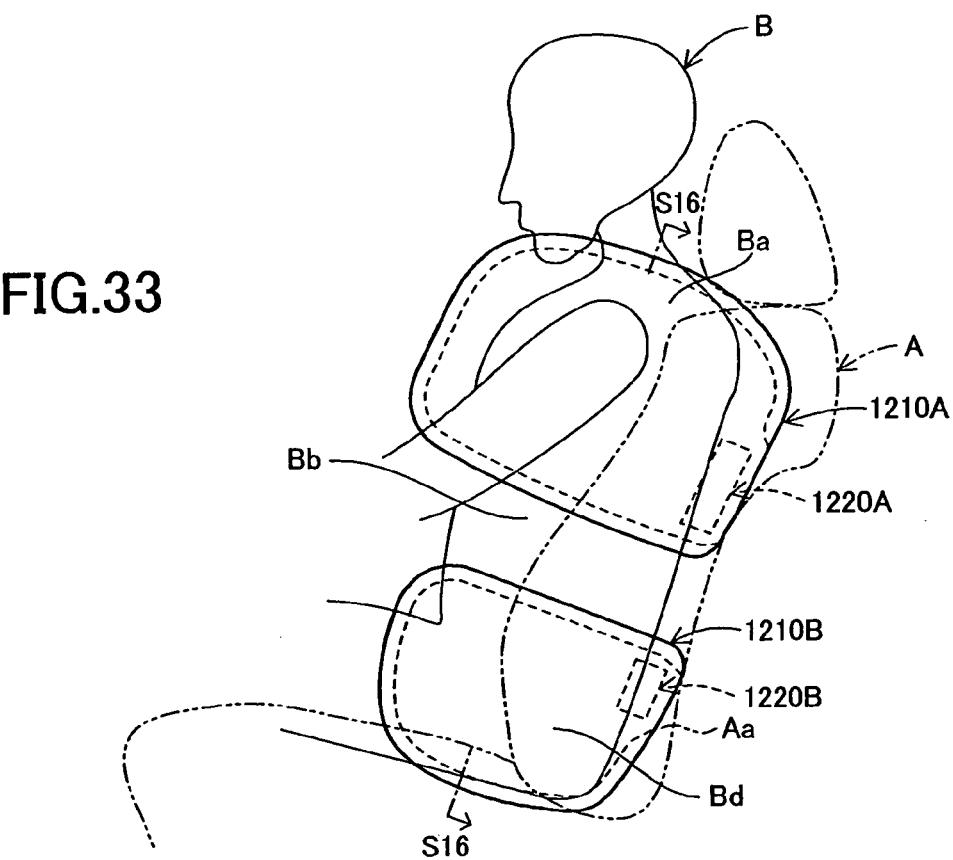
FIG. 33 is a side view schematically illustrating an occupant protection device according to a tenth embodiment of the present invention.
Figure 34:
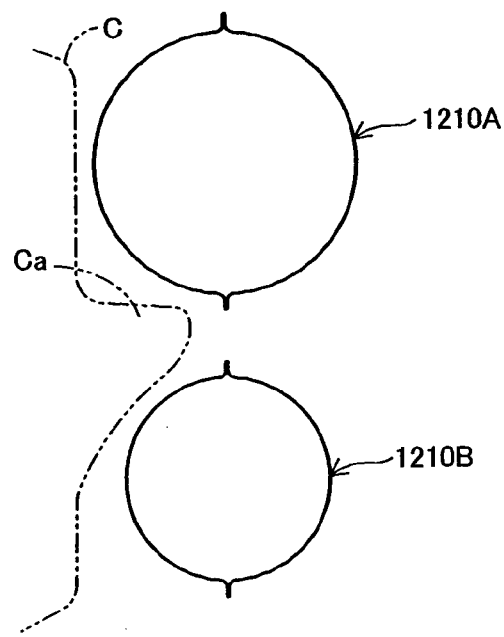
FIG. 34 is a vertical sectional view of FIG. 33 taken along line S16-S16.

In the above-described ninth embodiment, the airbag 1110 has the recess 1112 that can receive the armrest Ca on the inner side of the door C. Alternatively, however, as in a tenth embodiment schematically illustrated in FIGS. 33 and 34, an upper airbag 1210A and a lower airbag 1210B that face each other across the armrest Ca on the inner side of the door C may also be applied.

The upper airbag 1210A is disposed at a position corresponding to the shoulder Ba of the occupant B, and is attached to the seat back Aa of the seat A. In addition, an inflator 1220A is disposed in the upper airbag 1210A. The lower airbag 1210B is disposed at a position corresponding to the lumbar Bd of the occupant B, and is also attached to the seat back Aa of the seat A. In addition, an inflator 1220B is disposed in the lower airbag 1210B. In the tenth embodiment, the upper airbag 1210A is thicker than the lower airbag 1210B in the vehicle width direction in the inflated state.

The inflators 1220A and 1220B can be activated individually. In the tenth embodiment, the lower inflator 1220B is activated before the inflator 1220A so that the lower airbag 1210B is inflated before the upper airbag 1210A.

In the tenth embodiment having the above-described structure, when a side collision or the like of the vehicle occurs and the door C enters the vehicle cabin, the airbags 1210A and 1220B are barely pushed by the armrest Ca on the inner side of the door C. The upper airbag 1210A mainly pushes the shoulder Ba of the occupant B toward the center of the vehicle cabin in the vehicle width direction, and the lower airbag 1210B mainly pushes the lumbar Bd of the occupant B toward the center of the vehicle cabin in the vehicle width direction. Accordingly, when a side collision or the like of the vehicle occurs, the chest Bb of the occupant B is prevented from receiving a large local load.

In addition, in the tenth embodiment, the upper airbag 1210A is thicker than the lower airbag 1210B in the vehicle width direction in the inflated state. Therefore, a relatively large upper space between the shoulder Ba of the occupant B and an upper portion of the door C above the armrest Ca and a relatively small lower space between the lumbar Bd of the occupant B and a lower portion of the door C below the armrest Ca can be reliably filled with the upper and lower airbags 1210A and 1210B, respectively. Accordingly, the occupant can be reliably protected.

In addition, in the tenth embodiment, the lower airbag 1210B is inflated before the upper airbag 1210A. Accordingly, the lower airbag 1210B can be reliably inflated in the lower space between the lumbar Bd of the occupant B and the lower portion of the door C below the armrest Ca, which is smaller than the upper space between the shoulder Ba of the occupant B and the upper portion of the door C above the armrest Ca.

In addition, in the tenth embodiment, the upper and lower airbags 1210A and 1210B are provided with dedicated inflators 1220A and 1220B, respectively. Therefore, the times at which the inflators 1220A and 1220B are activated can be controlled individually, and the upper and lower airbags 1210A and 1210B can be inflated individually at desired times.

Figure 35:
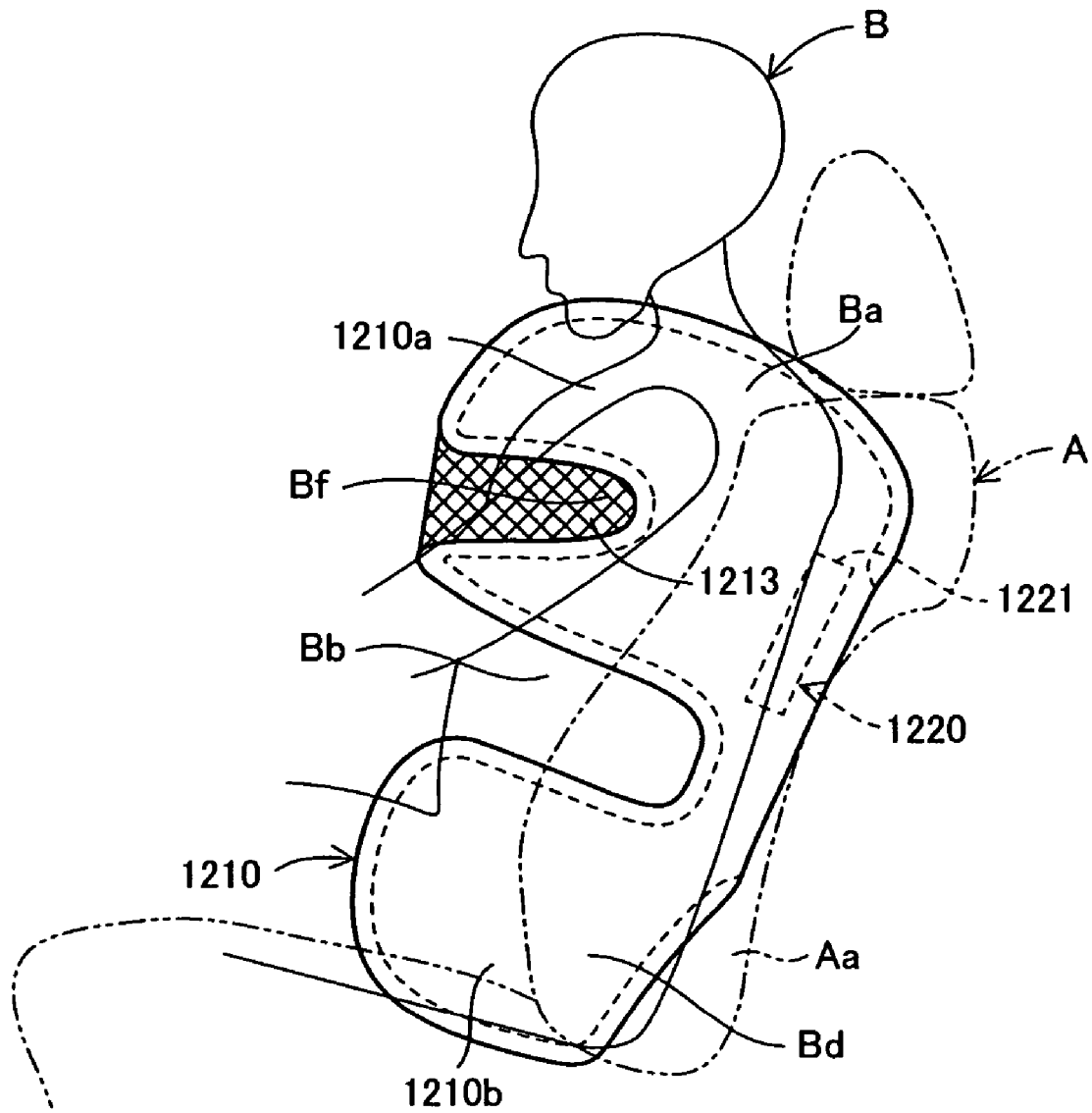
FIG. 35 is a side view schematically illustrating a modification of the tenth embodiment.

In the above-described tenth embodiment, the upper and lower airbags 1210A and 1210B that face each other across the armrest Ca on the inner side of the door C are used. Alternatively, however, as in a modification illustrated in FIG. 35, an airbag 1210 having an upper inflatable body 1210a and a lower inflatable body 1210b may also be used. In this case, the upper and lower inflatable bodies 1210a and 1210b are disposed so as to face each other across the armrest Ca on the inner side of the door C.

In this modification, an operation similar to that of the above-described tenth embodiment can be performed using an inflator 1220 having a gas discharge hole 1221 only at the top end thereof. In addition, in this modification, the upper inflatable body 1210a has an uninflatable section 1213 at a position corresponding to the upper arm Bf of the occupant B, so that a region corresponding to the upper arm Bf of the occupant B is thinner than other regions in the vehicle width direction in the inflated state.

Therefore, the upper arm Bf of the occupant B is prevented from being pushed by the upper inflatable body 1210a of the airbag 1210, and the load applied to the chest Bb of the occupant B by the upper arm Bf of the occupant B pushed by the upper inflatable body 1210a is reduced. Accordingly, when a side collision or the like of the vehicle occurs, the chest Bb of the occupant B is prevented from receiving a large local load.

Figure 36:
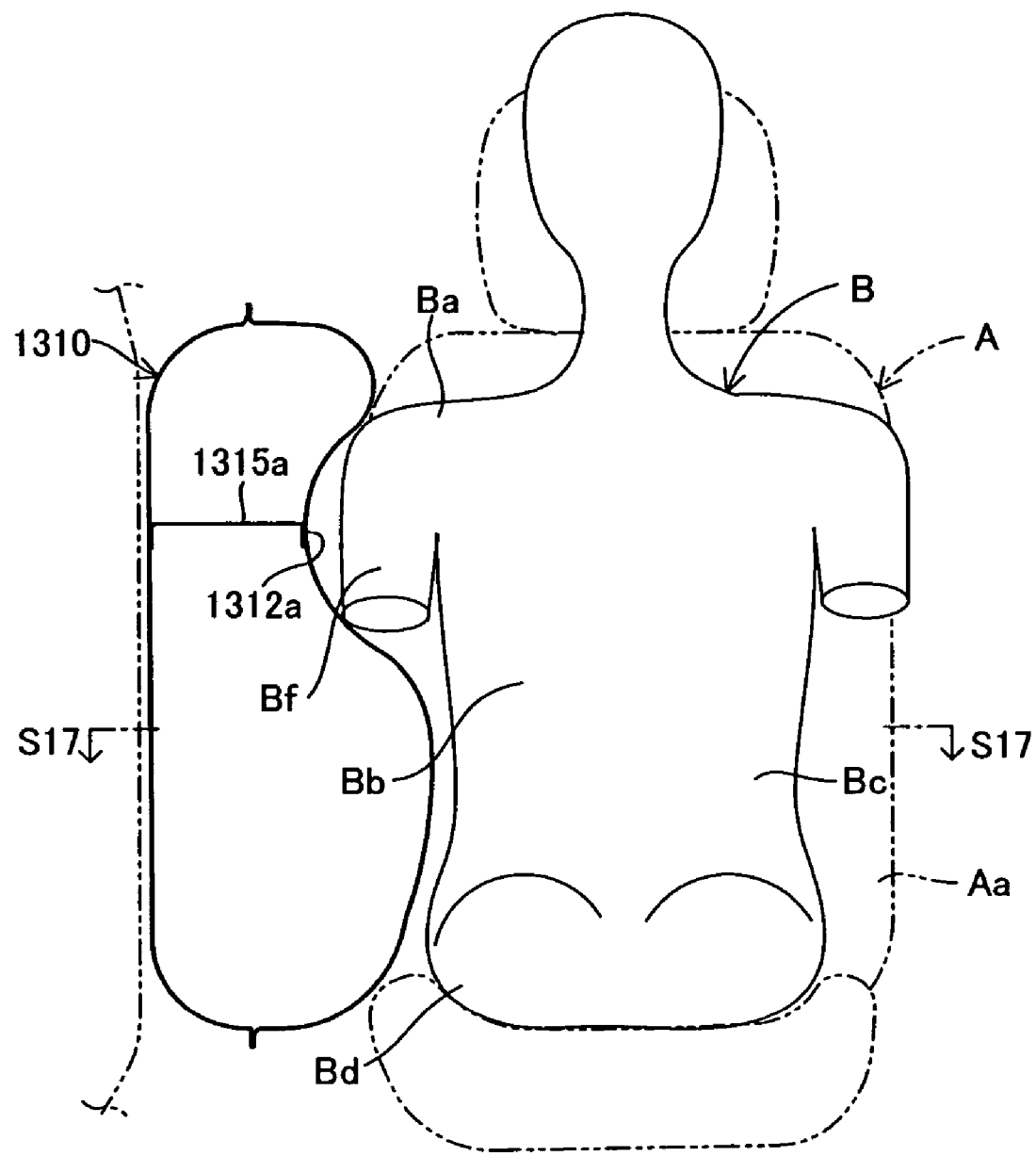
FIG. 36 is a vertically sectioned front view schematically illustrating an occupant protection device according to an eleventh embodiment of the present invention.
Figure 37:
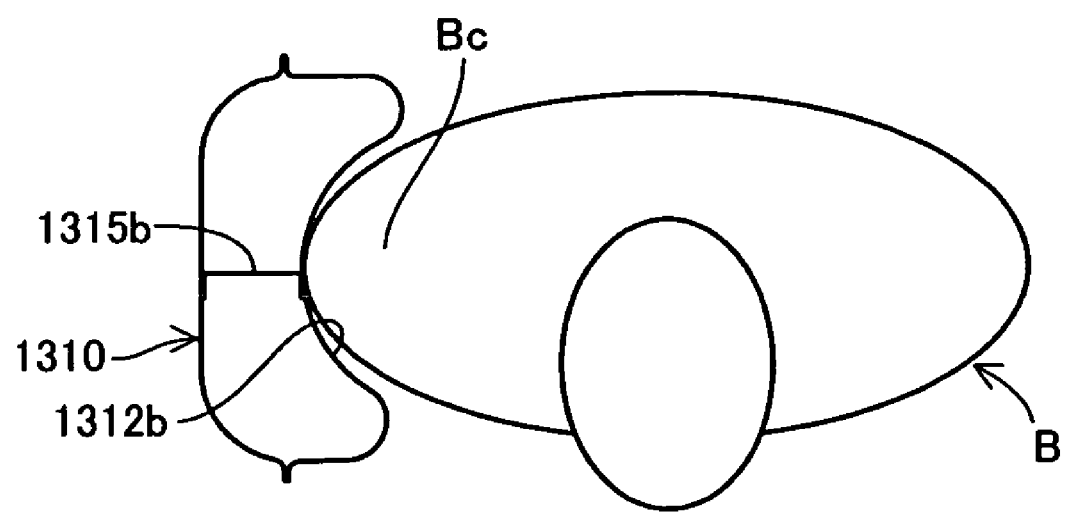
FIG. 37 is a horizontal sectional view of FIG. 36 taken along line S17-S17.

FIGS. 36 and 37 illustrate an eleventh embodiment. In the eleventh embodiment, an airbag 1310 is provided with straps 1315a and 1315b. As shown in FIG. 36, the upper strap 1315a is provided at a position corresponding to the upper arm Bf of the occupant B and regulates the inflation of the airbag 1310 such that a recess 1312a provided at a position corresponding to the upper arm Bf of the occupant B extends along the upper arm Bf of the occupant B when the airbag 1310 is inflated. As shown in FIG. 37, the lower strap 1315b is provided at a position corresponding to the abdomen Bc of the occupant B and regulates the inflation of the airbag 1310 such that a recess 1312b provided at a position corresponding to the abdomen Bc of the occupant B extends along the abdomen Bc of the occupant B when the airbag 1310 is inflated.

Accordingly, in the eleventh embodiment, a contact area between the recess 1312a of the airbag 1310 and the upper arm Bf of the occupant B and a contact area between the recess 1312b of the airbag 1310 and the abdomen Bc of the occupant B are increased compared to those in the above-described embodiments. Accordingly, when a side collision or the like of the vehicle occurs, the upper arm Bf and the abdomen Bc of the occupant B are prevented from receiving a large local load.

Figure 38:
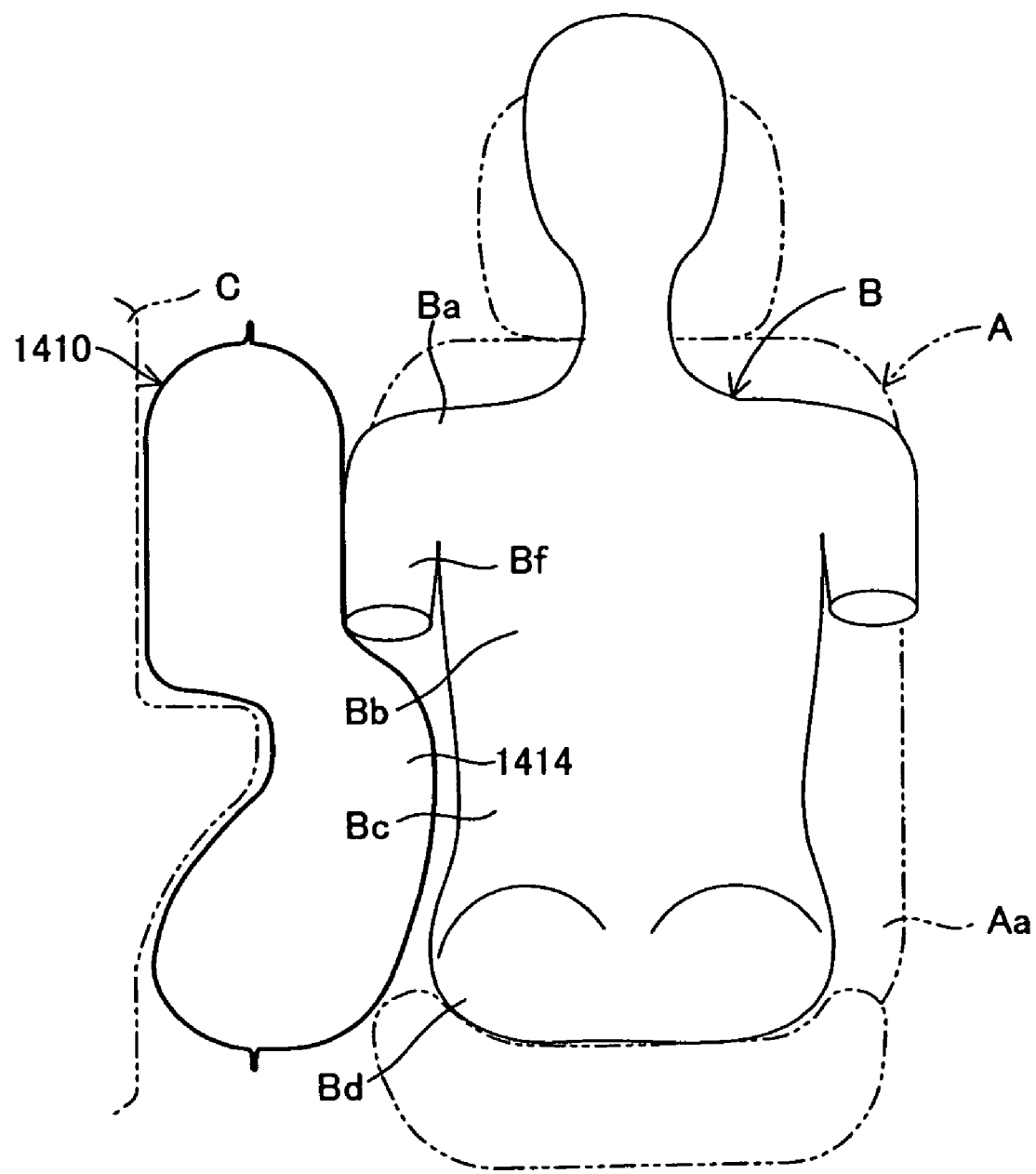
FIG. 38 is a vertically sectioned front view schematically illustrating an occupant protection device according to a twelfth embodiment of the present invention.

FIG. 38 illustrates a twelfth embodiment. In the twelfth embodiment, an airbag 1410 is formed in a bag-like shape by airtightly bonding two sheets of airbag material obtained by draping at a peripheral region thereof. Accordingly, the side of the airbag 1410 which faces the door C substantially extends along the inner side of the door C, and the side of the airbag 1410 which faces the occupant B substantially extends along the side of the occupant B.

In addition, the airbag 1410 has an inflatable body 1414 that fills a space between the inner side of the door C and the side of the occupant B which faces the door C in the inflated state. Therefore, in the twelfth embodiment, the substantial contact area between the airbag 1410 and the occupant B is increased. Accordingly, when a side collision or the like of the vehicle occurs, the side portion of the occupant B, that is, the shoulder Ba, the chest Bb, the abdomen Bc, and the lumbar Bd is prevented from receiving a large local load.

The invention claimed is:

1. An occupant protection device comprising:
   an airbag that is inflated with gas from an inflator at a side of an occupant to protect the body of the occupant from the shoulder to the lumbar, the airbag having substantially the same vertical dimension as that of a seat back, wherein:
   the airbag has a first region that is thinner than other regions in a vehicle width direction in the inflated state, the first region being disposed substantially at the center of the airbag in the vertical direction and extending substantially parallel to the seat back,
   the first region that is thin in the vehicle width direction in the inflated state is divided into sections in the vertical direction, and a gas passage is provided between the sections.

2. The occupant protection device according to claim 1, wherein the airbag also has a second region that is thin in the vehicle width direction in the inflated state, the second region being disposed in front of and above the first region at a position corresponding to the upper arm of the occupant.

3. The occupant protection device according to claim 1, wherein the first region that is thin in the vehicle width direction in the inflated state is substantially oval in side view.

4. The occupant protection device according to claim 1, wherein the airbag includes an inflatable body at the bottom of the airbag, the inflatable body being inflated at the side of the thigh of the occupant.

5. The occupant protection device according to claim 1, wherein the airbag is folded such that an upper portion and a lower portion are placed on a center portion and is then rolled or accordion-folded in a front-to-rear direction of the vehicle.

* * * * *